United States Patent
Shost et al.

(10) Patent No.: US 10,662,883 B2
(45) Date of Patent: May 26, 2020

(54) INTERNAL COMBUSTION ENGINE AIR CHARGE CONTROL

(71) Applicant: Tula Technology, Inc., San Jose, CA (US)

(72) Inventors: Mark A. Shost, Northville, MI (US); Matthew A. Younkins, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 305 days.

(21) Appl. No.: 15/487,127

(22) Filed: Apr. 13, 2017

(65) Prior Publication Data

US 2017/0218866 A1    Aug. 3, 2017

Related U.S. Application Data

(63) Continuation-in-part of application No. 14/705,712, filed on May 6, 2015, now Pat. No. 10,233,796.

(Continued)

(51) Int. Cl.
*F02D 41/00* (2006.01)
*F02D 17/02* (2006.01)
(Continued)

(52) U.S. Cl.
CPC .......... *F02D 41/0082* (2013.01); *F01L 1/146* (2013.01); *F01L 13/0005* (2013.01);
(Continued)

(58) Field of Classification Search
CPC ...... F02D 41/0087; F02D 17/02; F02D 13/06; F02D 2041/0012; F02D 41/0082;
(Continued)

(56) References Cited

U.S. PATENT DOCUMENTS 4,434,767 A    3/1984    Kohama et al.
4,489,695 A    12/1984   Kohama et al.
(Continued)

FOREIGN PATENT DOCUMENTS

DE    4406982        9/1998
DE    0980965 A2    2/2000
(Continued)

OTHER PUBLICATIONS

U.S. Office Action dated Jan. 10, 2019 from U.S. Appl. No. 14/705,712.
(Continued)

*Primary Examiner* — Sizo B Vilakazi
(74) *Attorney, Agent, or Firm* — Beyer Law Group LLP

(57) ABSTRACT

Internal combustion engine having cam actuated valves that can be controlled to facilitate the use of different air charge levels in different cylinders or sets of cylinders are described. In one aspect a first set of cylinders is operated in a skip fire manner in which the corresponding cylinders are deactivated during skipped working cycles. Cam actuated intake valves associated with a second set of cylinders are operated differently so that the air charge in the cylinders in the second set is different than the air charge in fired cylinders subject to the skip fire control. According to another aspect, an engine having cam actuated intake valves is operated in a dynamic firing level modulation mode. During the dynamic firing level modulation operation, the cam actuated intake valves are controlled in at least two different manners to such that different cylinder working cycles have different air charges.

23 Claims, 12 Drawing Sheets

Related U.S. Application Data

(60) Provisional application No. 61/991,767, filed on May 12, 2014.

(51) Int. Cl.

| | | |
|---|---|---|
| *F02B 75/20* | (2006.01) | |
| *F01L 13/00* | (2006.01) | |
| *F01L 1/14* | (2006.01) | |
| *F02D 13/06* | (2006.01) | |
| *F02B 75/18* | (2006.01) | |
| *F01L 1/18* | (2006.01) | |
| *F01L 1/34* | (2006.01) | |

(52) U.S. Cl.
CPC .......... *F01L 13/0026* (2013.01); *F02B 75/20* (2013.01); *F02D 13/06* (2013.01); *F02D 17/02* (2013.01); *F02D 41/0002* (2013.01); *F02D 41/0087* (2013.01); *F01L 1/185* (2013.01); *F01L 1/34* (2013.01); *F01L 2013/001* (2013.01); *F01L 2013/0068* (2013.01); *F01L 2013/0073* (2013.01); *F01L 2013/103* (2013.01); *F01L 2105/00* (2013.01); *F01L 2800/08* (2013.01); *F01L 2820/01* (2013.01); *F02B 2075/1816* (2013.01); *F02D 2041/0012* (2013.01); *Y02T 10/18* (2013.01); *Y02T 10/42* (2013.01)

(58) Field of Classification Search
CPC ..... F01L 1/18; F01L 1/047; F01L 1/20; F02B 75/20; F02B 2075/1816
USPC ...................................................... 123/198 F
See application file for complete search history.

(56) References Cited

U.S. PATENT DOCUMENTS

| | | | |
|---|---|---|---|
| 4,509,488 A | 4/1985 | Forster et al. | |
| 4,592,315 A | 6/1986 | Kobayashi et al. | |
| 4,991,558 A | 2/1991 | Daly et al. | |
| 5,117,790 A | 6/1992 | Clarke et al. | |
| 5,129,407 A | 7/1992 | Phillips et al. | |
| 5,154,151 A | 10/1992 | Bradshaw et al. | |
| 5,377,631 A | 1/1995 | Schechter | |
| 5,597,371 A | 1/1997 | Toukura | |
| 5,617,829 A | 4/1997 | Bidner et al. | |
| 5,713,315 A | 2/1998 | Jyoutaki et al. | |
| 5,743,221 A | 4/1998 | Schmitz | |
| 5,836,274 A | 11/1998 | Saito et al. | |
| 5,975,052 A | 11/1999 | Moyer | |
| 6,158,411 A | 12/2000 | Morikawa | |
| 6,343,581 B2 | 2/2002 | Suzuki | |
| 6,382,193 B1 | 5/2002 | Boyer et al. | |
| 6,443,125 B1 | 9/2002 | Mendler | |
| 6,484,677 B2 | 11/2002 | Leone et al. | |
| 6,571,771 B2 | 6/2003 | Doering et al. | |
| 6,600,989 B2 | 7/2003 | Sellnau et al. | |
| 6,619,258 B2 | 9/2003 | McKay et al. | |
| 6,647,947 B2 | 11/2003 | Boyer et al. | |
| 6,805,095 B2 | 10/2004 | Sun et al. | |
| 6,866,020 B2 | 3/2005 | Allston et al. | |
| 7,047,957 B1* | 5/2006 | Smith et al. ............ | F01L 1/053 123/673 |
| 7,058,501 B2 | 6/2006 | Yasui et al. | |
| 7,063,062 B2 | 6/2006 | Lewis et al. | |
| 7,066,136 B2 | 6/2006 | Ogiso | |
| 7,072,758 B2 | 7/2006 | Kolmanovsky et al. | |
| 7,086,386 B2 | 8/2006 | Doering | |
| 7,128,044 B1 | 10/2006 | Doering et al. | |
| 7,140,355 B2 | 11/2006 | Michelini et al. | |
| 7,146,966 B2 | 12/2006 | Nakamura | |
| 7,167,792 B1 | 1/2007 | Kolmanovsky et al. | |
| 7,249,583 B2 | 7/2007 | Bidner et al. | |
| 7,249,584 B2 | 7/2007 | Rozario et al. | |
| 7,260,467 B2 | 8/2007 | Megli et al. | |
| 7,377,260 B2 | 5/2008 | Jehle et al. | |
| 7,426,915 B2 | 9/2008 | Gibson et al. | |
| 7,503,312 B2 | 3/2009 | Surnilla et al. | |
| 7,562,530 B2 | 7/2009 | Kolmanovsky | |
| 7,577,511 B1 | 8/2009 | Tripathi et al. | |
| 7,603,972 B2 | 10/2009 | Han et al. | |
| 7,757,657 B2 | 7/2010 | Albertson et al. | |
| 7,765,806 B2 | 8/2010 | Clark | |
| 7,801,691 B2 | 9/2010 | Panciroli et al. | |
| 7,849,835 B2 | 12/2010 | Tripathi et al. | |
| 7,908,913 B2 | 3/2011 | Cinpinski et al. | |
| 7,930,087 B2 | 4/2011 | Gibson et al. | |
| 7,950,359 B2 | 5/2011 | Choi | |
| 7,954,474 B2 | 6/2011 | Tripathi et al. | |
| 8,028,665 B2 | 10/2011 | Ralston | |
| 8,061,318 B2 | 11/2011 | Cleary et al. | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,215,099 B2 | 7/2012 | Ono et al. | |
| 8,286,471 B2 | 10/2012 | Doering | |
| 8,312,849 B2 | 11/2012 | Roe et al. | |
| 8,347,857 B2 | 1/2013 | Cleary et al. | |
| 8,402,942 B2 | 3/2013 | Tripathi et al. | |
| 8,468,987 B2 | 6/2013 | Kirchweger et al. | |
| 8,473,179 B2 | 6/2013 | Whitney et al. | |
| 8,499,743 B2 | 8/2013 | Tripathi et al. | |
| 8,511,281 B2 | 8/2013 | Tripathi et al. | |
| 8,631,646 B2 | 1/2014 | Smith et al. | |
| 8,701,628 B2 | 4/2014 | Tripathi et al. | |
| 8,789,502 B2 | 7/2014 | Barnes | |
| 8,839,766 B2 | 9/2014 | Serrano et al. | |
| 8,892,330 B2 | 11/2014 | Yuille et al. | |
| 8,931,444 B2 | 1/2015 | McConville et al. | |
| 9,086,020 B2 | 7/2015 | Pirjaberi et al. | |
| 9,399,964 B2 | 7/2016 | Younkins et al. | |
| 9,476,373 B2 | 10/2016 | Younkins et al. | |
| 9,605,601 B2 | 3/2017 | Leone | |
| 9,879,616 B2 | 1/2018 | Tatavarthi et al. | |
| 10,337,419 B2* | 7/2019 | McCarthy, Jr. et al. ..................... | F02D 41/0052 |
| 2001/0023686 A1 | 9/2001 | Okamoto | |
| 2001/0035141 A1 | 11/2001 | Pierik | |
| 2002/0096134 A1 | 7/2002 | Michelini et al. | |
| 2003/0062019 A1 | 4/2003 | Schaefer-Siebert | |
| 2003/0230280 A1 | 12/2003 | Allston | |
| 2004/0182340 A1 | 9/2004 | Cecur | |
| 2004/0237949 A1 | 12/2004 | Yasui | |
| 2005/0000480 A1 | 1/2005 | Yasui et al. | |
| 2005/0045156 A1 | 3/2005 | Yokoi | |
| 2005/0150561 A1 | 7/2005 | Flynn et al. | |
| 2005/0161023 A1 | 7/2005 | Albertson | |
| 2005/0193720 A1* | 9/2005 | Surnilla et al. ...... | F02D 41/0082 60/285 |
| 2005/0199220 A1 | 9/2005 | Ogiso | |
| 2005/0268880 A1 | 12/2005 | Bidner et al. | |
| 2005/0284438 A1 | 12/2005 | Hasebe | |
| 2006/0020386 A1 | 1/2006 | Kang | |
| 2006/0037578 A1 | 2/2006 | Nakamura | |
| 2006/0101903 A1 | 5/2006 | Moninger | |
| 2006/0169231 A1 | 8/2006 | Fuwa | |
| 2006/0180119 A1 | 8/2006 | Winstead | |
| 2006/0236960 A1 | 10/2006 | Nakamura et al. | |
| 2007/0006831 A1 | 1/2007 | Leone et al. | |
| 2007/0012283 A1 | 1/2007 | Rockwell | |
| 2007/0131196 A1 | 6/2007 | Gibson et al. | |
| 2007/0157901 A1 | 7/2007 | Caine et al. | |
| 2007/0215106 A1 | 9/2007 | Petridis et al. | |
| 2007/0233332 A1 | 10/2007 | Kawada et al. | |
| 2007/0234985 A1 | 10/2007 | Kolmanovsky | |
| 2007/0235005 A1 | 10/2007 | Lewis | |
| 2008/0035082 A1 | 2/2008 | Liu et al. | |
| 2008/0135021 A1 | 6/2008 | Michelini et al. | |
| 2008/0156293 A1 | 7/2008 | Huang | |
| 2009/0048764 A1 | 2/2009 | Fuwa | |
| 2009/0151673 A1 | 6/2009 | Choi | |
| 2009/0177371 A1 | 7/2009 | Reinke | |
| 2009/0204312 A1 | 8/2009 | Moriya | |

(56) References Cited

U.S. PATENT DOCUMENTS

| | | | |
|---|---|---|---|
| 2009/0277407 A1 | 11/2009 | Ezaki | |
| 2010/0006065 A1 | 1/2010 | Tripathi et al. | |
| 2010/0050993 A1 | 3/2010 | Zhao et al. | |
| 2010/0100299 A1 | 4/2010 | Tripathi et al. | |
| 2011/0000459 A1 | 1/2011 | Elsäßer | |
| 2011/0030657 A1 | 2/2011 | Tripathi et al. | |
| 2011/0073069 A1 | 3/2011 | Marriott et al. | |
| 2011/0139099 A1 | 6/2011 | Roe | |
| 2011/0146637 A1 | 6/2011 | Kang | |
| 2011/0208405 A1 | 8/2011 | Tripathi et al. | |
| 2011/0213541 A1 | 9/2011 | Tripathi et al. | |
| 2011/0214640 A1 | 9/2011 | Chang et al. | |
| 2012/0031357 A1 | 2/2012 | Ervin et al. | |
| 2012/0042633 A1 | 2/2012 | Silvestri et al. | |
| 2012/0323470 A1* | 12/2012 | Klingbeil et al. | F02D 41/0065 701/108 |
| 2013/0006497 A1 | 1/2013 | Silvers et al. | |
| 2013/0008412 A1 | 1/2013 | Kidooka | |
| 2013/0066502 A1 | 3/2013 | Yuille et al. | |
| 2013/0092128 A1 | 4/2013 | Pirjaberi et al. | |
| 2013/0118443 A1 | 5/2013 | Tripathi et al. | |
| 2013/0179051 A1* | 7/2013 | Tomimatsu et al. | F02D 17/02 701/104 |
| 2013/0276730 A1 | 10/2013 | Borean | |
| 2014/0041624 A1 | 2/2014 | Rayl et al. | |
| 2014/0041625 A1 | 2/2014 | Pirjaberi et al. | |
| 2014/0045652 A1 | 2/2014 | Carlson et al. | |
| 2014/0069381 A1 | 3/2014 | Beikmann | |
| 2014/0109847 A1 | 4/2014 | Hayman et al. | |
| 2014/0137819 A1* | 5/2014 | McConville et al. | F01L 13/0036 123/90.6 |
| 2014/0158067 A1 | 6/2014 | Woo et al. | |
| 2014/0261338 A1* | 9/2014 | Lippitt | F02B 75/1896 123/51 A |
| 2014/0277999 A1* | 9/2014 | Switkes | F02D 13/0219 701/102 |
| 2014/0318485 A1 | 10/2014 | Stolk et al. | |
| 2014/0360477 A1 | 12/2014 | Doering et al. | |
| 2015/0233308 A1 | 8/2015 | Kidooka | |
| 2015/0308301 A1 | 10/2015 | McConville | |
| 2015/0322869 A1 | 11/2015 | Shost | |
| 2016/0003168 A1 | 1/2016 | Leone | |
| 2016/0003169 A1 | 1/2016 | Leone et al. | |
| 2016/0010568 A1 | 1/2016 | Whiston et al. | |
| 2016/0040614 A1 | 2/2016 | Younkins et al. | |
| 2016/0108798 A1 | 4/2016 | VanDerWege | |
| 2016/0108828 A1 | 4/2016 | Glugla | |
| 2016/0115878 A1 | 4/2016 | VanDerWege | |
| 2016/0115884 A1 | 4/2016 | VanDerWege | |
| 2016/0146120 A1 | 5/2016 | Kawaguchi | |
| 2016/0160701 A1 | 6/2016 | Choi et al. | |
| 2016/0222899 A1 | 8/2016 | Glugla | |
| 2016/0377007 A9 | 12/2016 | Wilcutts et al. | |
| 2017/0009729 A1 | 1/2017 | Younkins et al. | |

FOREIGN PATENT DOCUMENTS

| | | |
|---|---|---|
| EP | 2669495 | 12/2013 |
| IN | WO 2012112817 | 8/2012 |
| IN | WO 2016036936 | 3/2016 |
| JP | 2001-271661 | 10/2001 |
| JP | 2001271661 A * | 10/2001 |
| JP | 2006242012 A | 9/2006 |
| WO | WO 2010/006311 | 1/2010 |
| WO | WO 2011/085383 | 7/2011 |

OTHER PUBLICATIONS

Notice of Allowance dated Jan. 30, 2019 from U.S. Appl. No. 14/705,712.
Japanese Office Action dated Dec. 12, 2018 from Japanese Application No. 2017-523940.
Chinese Office Action dated Feb. 1, 2018 from Chinese Application No. 201580059861.X.
German Office Action dated Sep. 12, 2018 from German Application No. 11 2015 005 091.4.
U.S. Office Action dated May 23, 2018 from U.S. Appl. No. 15/485,000.
U.S. Final Office Action dated Dec. 20, 2017 from U.S. Appl. No. 14/705,712.
U.S. Office Action dated Jul. 13, 2018 from U.S. Appl. No. 14/705,712.
International Search Report dated Feb. 19, 2016 from International Application No. PCT/US2015/059776.
Written Opinion dated Feb. 19, 2016 from International Application No. PCT/US2015/059776.
International Search Report dated Sep. 3, 2015 from International Application No. PCT/US 15/29543.
Written Opinion dated Sep. 3, 2015 from International Application No. PCT/US 15/29543.
Younkins et al., U.S. Appl. No. 14/919,018, filed Oct. 21, 2015.
Younkins et al., U.S. Appl. No. 15/274,029, filed Sep. 23, 2016.
Younkins et al., U.S. Appl. No. 15/485,000, filed Apr. 11, 2017.
Shost et al., U.S. Appl. No. 14/705,712, filed May 6, 2015.
Japanese Notice of Allowance dated Jul. 2, 2019 from Japanese Application No. 2017-523940.

\* cited by examiner

| Level | FF | Sequence # | Bank Firing Pattern | Cylinder Firing Pattern |
|---|---|---|---|---|
| 1 | 0 | 1 | | |
| 2 | 1/9 | 1 | LR | F1, 8S, F4, 8S |
| 2 | 1/9 | 2 | RL | 1S, F2, 8S, F5, 7S |
| 2 | 1/9 | 3 | LR | 2S, F3, 8S, F6, 6S |
| 3 | 1/8 | 1 | LLL | F1, 7S, F3, 7S, F5, 7S |
| 3 | 1/8 | 2 | RRR | 1S, F2, 7S, F4, 7S, F6, 6S |
| 4 | 1/7 | 1 | LRLRLR | F1, 6S, F2, 6S, F3, 6S, F4, 6S, F5, 6S, F6, 6S |
| 5 | 1/6 | 1 | L | F1, 5S |
| 5 | 1/6 | 2 | R | 1S, F2, 4S |
| 5 | 1/6 | 3 | L | 2S, F3, 3S |
| 5 | 1/6 | 4 | R | 3S, F4, 2S |
| 5 | 1/6 | 5 | L | 4S, F5, 1S |
| 5 | 1/6 | 6 | R | 5S, F6 |
| 6 | 1/5 | 1 | LRLRLR | F1, 4S, F6, 4S, F5, 4S, F4, 4S, F3, 4S, F2, 4S |
| 7 | 2/9 | 1 | LLRR | F1, 3S, F5, 4S, F4, 3S, F2, 4S |
| 7 | 2/9 | 2 | RRLL | 1S, F2, 3S, F6, 4S, F5, 3S, F3, 3S |
| 7 | 2/9 | 3 | LLRR | 2S, F3, 3S, F1, 4S, F6, 3S, F4, 2S |
| 8 | 1/4 | 1 | LLL | F1, 3S, F5, 3S, F3, 3S |
| 8 | 1/4 | 2 | RRR | 1S, F2, 3S, F6, 3S, F4, 2S |
| 9 | 2/7 | 1 | LRRLRRLLRRL | F1, 2S, F4, 3S, F2, 2S, F5, 3S, F3, 2S, F6, 3S, F4, 2S, F1, 3S, F5, 2S, F2, 3S, F6, 2S, F3, 3S |
| 10 | 1/3 | 1 | LR | F1, 2S, F4, 2S |
| 10 | 1/3 | 2 | RL | 1S, F2, 2S, F5, 1S |
| 10 | 1/3 | 3 | LR | 2S, F3, 2S, F6 |
| 11 | 3/8 | 1 | LLRLLRLLR | F1, 1S, F3, 2S, F6, 2S, F3, 1S, F5, 2S, F2, 2S, F5, 1S, F1, 2S, F4, 2S |
| 11 | 3/8 | 2 | RRLRRLRRL | 1S, F2, 1S, F4, 2S, F1, 2S, F4, 1S, F6, 2S, F3, 2S, F6, 1S, F2, 2S, F5, 1S |
| 12 | 2/5 | 1 | LLRRLLRRLLRR | F1, 1S, F3, 2S, F6, 1S, F2, 2S, F5, 1S, F1, 2S, F4, 1S, F6, 2S, F3, 1S, F5, 2S, F2, 1S, F4, 2S |
| 13 | 3/7 | 1 | LLLRRRLLLRRRLLLRRR | F1, 1S, F3, 1S, F5, 2S, F2, 1S, F4, 1S, F6, 2S, F3, 1S, F5, 1S, F1, 2S, F4, 1S, F6, 1S, F2, 2S, F5, 1S, F1, 1S, F3, 2S, F6, 1S, F2, 1S, F4, 2S |
| 14 | 4/9 | 1 | LLLLRRRR | F1, 1S, F3, 1S, F5, 1S, F1, 2S, F4, 1S, F6, 1S, F2, 1S, F4, 2S |
| 14 | 4/9 | 2 | RRRRLLLL | 1S, F2, 1S, F4, 1S, F6, 1S, F2, 2S, F5, 1S, F1, 1S, F3, 1S, F5, 1S |
| 14 | 4/9 | 3 | LLLLRRRR | 2S, F3, 1S, F5, 1S, F1, 1S, F3, 2S, F6, 1S, F2, 1S, F4, 1S, F6 |
| 15 | 1/2 | 1 | LLL | F1, 1S, F3, 1S, F5, 1S |
| 15 | 1/2 | 2 | RRR | 1S, F2, 1S, F4, 1S, F6 |
| 16 | 5/9 | 1 | LRRRRLLLL | F1, F2, 1S, F4, 1S, F6, 1S, 1S, F4, F5, 1S, F1, 1S, F3, 1S, F5, 1S |
| 16 | 5/9 | 2 | RLLLLRRRR | 1S, F2, 1S, F5, 1S, F1, 1S, F3, 1S, F5, F6, 1S, F2, 1S, F4, 1S, F6 |
| 16 | 5/9 | 3 | LLRRRRLLL | F1, 1S, F3, 1S, F4, 1S, F6, 1S, F2, 1S, F4, 1S, F6, F1, 1S, F3, 1S, F5, 1S |
| 17 | 4/7 | 1 | LRRRRLLLRRRLLLRRRRL LL | F1, 1S, F3, 1S, F4, 1S, F6, 1S, F2, 1S, F3, 1S, F5, 1S, F1, 1S, F3, F4, 1S, F6, 1S, F2, 1S, F4, 1S, F6, 1S, F2, 1S, F4, 1S, F6, 1S F1, 1S, F3, 1S, F5, 1S, F1, 1S, F3, 1S, F5, 1S |
| 18 | 3/5 | 1 | LRRRLLLRRRLLLRRRLL | F1, F2, 1S, F4, 1S, F6, F1, 1S, F3, 1S, F5, F6, 1S, F2, 1S, F4, F5, 1S, F1, 1S, F3, F4, 1S, F6, 1S, 1S, F2, F3, 1S, F5, 1S |
| 19 | 5/8 | 1 | LRRLLRRLLRRLL | F1, F2, 1S, F4, F5, 1S, F1, 1S, F3, F4, 1S, F6, 1S, F2, F3, 1S, F5, 1S |
| 19 | 5/8 | 2 | RLLRRLLRRLLRR | 1S, F2, F3, 1S, F5, F6, 1S, F2, 1S, F4, F5, 1S, F1, 1S, F3, F4, 1S, F6 |
| 20 | 2/3 | 1 | LRRL | F1, F2, 1S, F4, F5, 1S |
| 20 | 2/3 | 2 | RLLR | 1S, F2, 1S, F5, F6 |
| 20 | 2/3 | 3 | LLRR | F1, 1S, F3, F4, 1S, F6 |
| 21 | 5/7 | 1 | LRLLRRLLRLLRLRRLLRL RL LRRLRRRL | F1, F2, F3, 1S, F5, F6, 1S, F2, F3, F4, 1S, F6, F1, 1S, F3, F4, 1S, F6, F1, F2, 1S, F4, F5, F6, 1S, F2, F3, F4, F5, F6, 1S, F2, F3, 1S, F5, F6, F1, 1S, F3, F4, 1S, F6, F1, F2, 1S, F4, F5, 1S |
| 22 | 3/4 | 1 | LRLLRLLRL | F1, F2, F3, 1S, F5, F6, F1, 1S, F3, F4, F5, 1S |
| 22 | 3/4 | 2 | RLRRLRRLR | 1S, F2, F3, F4, 1S, F6, F1, F2, 1S, F4, F5, F6 |
| 23 | 7/9 | 1 | LRLRRLRRLRLRL | F1, F2, F3, F4, 1S, F6, F1, F2, 1S, F4, F5, F6, F1, 1S, F3, F4, F5, 1S |
| 23 | 7/9 | 2 | RLRLLRLLRLRLR | 1S, F2, F3, F4, F5, 1S, F6, F1, F2, F3, 1S, F5, F6, F1, F2, 1S, F4, F6 |
| 23 | 7/9 | 3 | LLRLRRLRRLLLR | F1, 1S, F3, F4, F5, F6, 1S, F2, F3, F4, 1S, F6, F1, F2, F3, 1S, F5, F6 |
| 24 | 4/5 | 1 | LRLRLRRLRLRLRRLLRRL RL | F1, F2, F3, F4, 1S, F6, F1, F2, F3, 1S, F5, F6, F1, F2, 1S, F4, F5, F6, F1, 1S, F3, F4, F5, F6, 1S, F2, F3, F4, F5, 1S |
| 25 | 5/6 | 1 | LRLRL | F1, F2, F3, F4, F5, 1S |
| 25 | 5/6 | 2 | RLRLR | 1S, F2, F3, F4, F5, F6 |
| 25 | 5/6 | 3 | LLRLR | F1, 1S, F3, F4, F5, F6 |
| 25 | 5/6 | 4 | LRRLR | F1, F2, 1S, F4, F5, F6 |
| 25 | 5/6 | 5 | LRLLR | F1, F2, F3, 1S, F5, F6 |
| 25 | 5/6 | 6 | LRLRR | F1, F2, F3, F4, 1S, F6 |
| 26 | 6/7 | 1 | LRLRLRRLRLRLRLRLRLRL RLLRRLRLRLRL | F1, F2, F3, F4, F5, 1S, F2, F3, F4, F5, F6, F1, 1S, F3, F4, F5, F6, F1, F2, 1S, F4, F5, F6, F1, F2, F3, 1S, F5, F6, F1, F2, F3, F4, 1S |
| 27 | 7/8 | 1 | LRLRLRLRRLRLRLRL | F1, F2, F3, F4, F5, F6, F1, F2, F3, F4, F5, 1S, F5, F6, F1, F2, F3, F4, F5, 1S |
| 27 | 7/8 | 2 | LRLRLRLRLRLRLRLR | F1, F2, F3, F4, F5, F6, F1, F2, 1S, F4, F5, F6, F1, F2, F3, F4, F5, F6 |
| 28 | 8/9 | 1 | LRLRLRLRLRLRLRLRLR | F1, F2, F3, F4, F5, F6, F1, F2, F3, F4, F5, F6, F1, F2, F3, F4, F5, 1S |
| 28 | 8/9 | 2 | LRLRLRLRLLRLRLRLR | F1, F2, F3, F4, F5, F6, F1, F2, F3, 1S, F5, F6, F1, F2, F3, F4, F5, F6 |
| 28 | 8/9 | 3 | LLRLRLRLRLRRLRLRLR | F1, 1S, F3, F4, F5, F6, F1, F2, F3, F4, 1S, F6, F1, F2, F3, F4, F5, F6 |
| 29 | 1 | 1 | LRLRLR | F1, F2, F3, F4, F5, F6 |

FIG. 5A

| Firing fraction | Bank 1 (1=activate, 0=deactivate) | Bank 1 output | Bank 2 valve lift command | Bank 2 output | Engine output |
|---|---|---|---|---|---|
| 1 | 1 | 0.50 | 1 | 0.50 | 1.000 |
| 1 | 1 | 0.50 | 0.75 | 0.38 | 0.875 |
| 1 | 1 | 0.50 | 0.5 | 0.25 | 0.750 |
| 1 | 1 | 0.50 | 0.25 | 0.13 | 0.625 |
| 1 | 1 | 0.50 | 0 | 0.00 | 0.500 |
| 1/2 | 0 | 0 | 1 | 0.50 | 0.500 |
| 1/2 | 0 | 0 | 0.75 | 0.38 | 0.375 |
| 1/2 | 0 | 0 | 0.5 | 0.25 | 0.250 |
| 1/2 | 0 | 0 | 0.25 | 0.13 | 0.125 |

*FIG. 5B*

| Firing fraction | Bank 1 firing fraction | Bank 1 output | Bank 2 valve lift command | Bank 2 output | Engine output |
|---|---|---|---|---|---|
| 1 | 1 | 0.50 | 1 | 0.5 | 1.000 |
| 1 | 1 | 0.50 | 0.75 | 0.375 | 0.875 |
| 7/8 | 3/4 | 0.38 | 1 | 0.5 | 0.875 |
| 5/6 | 2/3 | 0.33 | 1 | 0.5 | 0.833 |
| 1 | 1 | 0.50 | 0.5 | 0.25 | 0.750 |
| 7/8 | 3/4 | 0.38 | 0.75 | 0.375 | 0.750 |
| 3/4 | 1/2 | 0.25 | 1 | 0.5 | 0.750 |
| 5/6 | 2/3 | 0.33 | 0.75 | 0.375 | 0.708 |
| 2/3 | 1/3 | 0.17 | 1 | 0.5 | 0.667 |
| 1 | 1 | 0.50 | 0.25 | 0.125 | 0.625 |
| 7/8 | 3/4 | 0.38 | 0.5 | 0.25 | 0.625 |
| 3/4 | 1/2 | 0.25 | 0.75 | 0.375 | 0.625 |
| 5/8 | 1/4 | 0.13 | 1 | 0.5 | 0.625 |
| 5/6 | 2/3 | 0.33 | 0.5 | 0.25 | 0.583 |
| 2/3 | 1/3 | 0.17 | 0.75 | 0.375 | 0.542 |
| 1 | 1 | 0.50 | 0 | 0 | 0.500 |
| 7/8 | 3/4 | 0.38 | 0.25 | 0.125 | 0.500 |
| 3/4 | 1/2 | 0.25 | 0.5 | 0.25 | 0.500 |
| 5/8 | 1/4 | 0.13 | 0.75 | 0.375 | 0.500 |
| 1/2 | 0 | 0.00 | 1 | 0.5 | 0.500 |
| 5/6 | 2/3 | 0.33 | 0.25 | 0.125 | 0.458 |
| 2/3 | 1/3 | 0.17 | 0.5 | 0.25 | 0.417 |
| 7/8 | 3/4 | 0.38 | 0 | 0 | 0.375 |
| 3/4 | 1/2 | 0.25 | 0.25 | 0.125 | 0.375 |
| 5/8 | 1/4 | 0.13 | 0.5 | 0.25 | 0.375 |
| 1/2 | 0 | 0.00 | 0.75 | 0.375 | 0.375 |
| 5/6 | 2/3 | 0.33 | 0 | 0 | 0.333 |
| 2/3 | 1/3 | 0.17 | 0.25 | 0.125 | 0.292 |
| 3/4 | 1/2 | 0.25 | 0 | 0 | 0.250 |
| 5/8 | 1/4 | 0.13 | 0.25 | 0.125 | 0.250 |
| 1/2 | 0 | 0.00 | 0.5 | 0.25 | 0.250 |
| 2/3 | 1/3 | 0.17 | 0 | 0 | 0.167 |
| 5/8 | 1/4 | 0.13 | 0 | 0 | 0.125 |
| 1/2 | 0 | 0.00 | 0.25 | 0.125 | 0.125 |

*FIG. 5C*

Illustrative Example of V-6 engine with firing order 1,2,3,4,5,6 utilizing Valve Lift Control in Conjunction with Skip Fire and Valve Lift Control Command to achieve targeted Engine Output

| row | Firing Fraction | firing sequence | Engine Cycle #1 | | | | | Engine Cycle #2 | | | | | ave engine output over FF sequence |
|---|---|---|---|---|---|---|---|---|---|---|---|---|---|
| | | | # firing cylinders Bank 1 | Lift Control Bank 1 | # firing cylinders Bank 2 | Lift Control Bank 2 | Engine Output Cycle 1 | # firing cylinders Bank 1 | Lift Control Bank 1 | # firing cylinders Bank 2 | Lift Control Bank 2 | Engine Output Cycle 2 | |
| 1 | 1 | 1,2,3,4,5,6 | 3 | 1 | 3 | 1 | 1 | | | | | | 1 |
| 2 | 1 | 1,2,3,4,5,6 | 3 | 0.5 | 3 | 0.5 | 0.5 | | | | | | 0.5 |
| 3 | 1 | 1,2,3,4,5,6 | 3 | 1 | 3 | 0 | 0.5 | | | | | | 0.5 |
| 4 | 1 | 1,2,3,4,5,6 | 3 | 0 | 3 | 1 | 0.5 | | | | | | 0.5 |
| 5 | 1/2 | 1,3,5 | 3 | 1 | 0 | | 0.5 | | | | | | 0.5 |
| 6 | 1/2 | 2,4,6 | 0 | | 3 | 1 | 0.5 | | | | | | 0.5 |
| 7 | 2/3 | 1,2,4,5 | 2 | 0.75 | 2 | 0.75 | 0.5 | | | | | | 0.5 |
| 8 | 2/3 | 2,3,5,6 | 2 | 0.5 | 2 | 1 | 0.5 | | | | | | 0.5 |
| 9 | 2/3 | 1,3,4,6 | 2 | 1 | 2 | 0.5 | 0.5 | | | | | | 0.5 |
| 10 | 3/4 | 1,2,3,5,6 ; 1,2,4,5 | 3 | 0.667 | 2 | 0.667 | 0.556 | 3 | 0.667 | 3 | 0.667 | 0.444 | 0.5 |
| 11 | 3/4 | 2,3,4,5 ; 1,2,4,5,6 | 2 | 0.667 | 3 | 0.667 | 0.444 | 2 | 0.667 | 3 | 0.667 | 0.556 | 0.5 |
| 12 | 3/4 | 2,3,4,5 ; 1,2,4,5,6 | 2 | 0.75 | 3 | 0.625 | 0.458 | 2 | 0.75 | 3 | 0.625 | 0.563 | 0.5 |
| 13 | 3/4 | 1,2,3,5,6 ; 1,3,4,5 | 3 | 0.75 | 2 | 0.625 | 0.583 | 3 | 0.75 | 1 | 0.625 | 0.479 | 0.53125 |
| 14 | 3/4 | 1,2,3,5,6 ; 1,3,4,5 | 3 | 0.75 | 2 | 0.5 | 0.54167 | 3 | 0.75 | 1 | 0.5 | 0.45833 | 0.5 |
| 15 | 3/4 | 1,2,3,5,6 ; 1,3,4,5 | 3 | 0.6875 | 2 | 0.625 | 0.552 | 3 | 0.6875 | 1 | 0.625 | 0.448 | 0.5 |

*FIG. 7*

INTERNAL COMBUSTION ENGINE AIR CHARGE CONTROL

CROSS REFERENCE TO RELATED APPLICATIONS

This application is a continuation in part of U.S. patent application Ser. No. 14/705,712, filed May 6, 2015, which claims priority of U.S. Provisional Patent Application Nos. 61/991,767, filed May 12, 2014. Each of these priority applications is incorporated herein by reference.

BACKGROUND

Field of the Described Embodiments

The described embodiments relate generally to internal combustion engines and to methods and arrangements for controlling internal combustion engines to operate more efficiently. More particularly, methods and arrangements for controlling internal combustion engines using variable valve lift and cylinder deactivation are described.

Description of the Related Art

The output of many internal combustion engines is controlled by adjusting the mass air charge (MAC) delivered to each fired cylinder. An engine control unit (ECU) directs delivery of the appropriate fuel charge for the commanded MAC. Gasoline fueled engines generally operate with an air/fuel ratio at or near stoichiometry to facilitate conversion of harmful pollutants to more benign compounds in a catalytic converter. Control of the MAC is most easily accomplished by adjusting the throttle position which in turn alters the intake manifold pressure (MAP). However, it should be appreciated that the MAC can be varied using other techniques as well. For example, variable intake valve lift control can be used to adjust the MAC. Adjusting the valve lift has the advantage of reducing pumping losses thereby increasing fuel efficiency, particularly at low or intermediate engine loads. A disadvantage of valve lift control is that the hardware needed to implement valve lift control tends to be relatively expensive and the control algorithms complex. Other techniques (e.g. altering the valve timing with a cam phaser) can also be used to adjust the MAC; however, use of a cam phaser has only a limited range of control over the MAC. There are a number of other engine parameters, including fuel charge, spark advance timing, etc. that may be used to alter the torque provided by each firing as well; however, use of these control parameters generally results in a lower fuel economy. If the controlled engine permits wide variations of the air-fuel ratio (e.g. as is permitted in most diesel engines), it is possible to vary the cylinder torque output by solely adjusting the fuel charge.

Over the years there have been a wide variety of efforts made to improve the fuel efficiency of internal combustion engines. One approach that has gained popularity is to vary the displacement of the engine. Most commercially available variable displacement engines effectively "shut down" or "deactivate" some of the cylinders during certain low-load operating conditions. When a cylinder is "deactivated", its piston typically still reciprocates; however, neither air nor fuel is delivered to the cylinder so the piston does not deliver any net power. Since the cylinders that are shut down do not deliver any power, the proportional load on the remaining cylinders is increased, thereby allowing the remaining cylinders to operate with improved fuel efficiency. Also, the reduction in pumping losses improves overall engine efficiency resulting in further improved fuel efficiency.

Another method of controlling internal combustion engines is skip fire control where selected combustion events are skipped during operation of an internal combustion engine so that other working cycles operate at better efficiency. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions. With skip fire control, cylinders are also preferably deactivated during skipped working cycles in the sense that air is not pumped through the cylinder and no fuel is delivered and/or combusted during skipped working cycles when such valve deactivation mechanism is available. Often, no air is introduced to the deactivated cylinders during the skipped working cycles thereby reducing pumping losses. The Applicants have filed a number of patent applications generally directed at dynamic skip fire control. These include U.S. Pat. Nos. 7,849,835; 7,886,715; 7,954,474; 8,099,224; 8,131,445; 8,131,447; 8,336,521; 8,449,743; 8,511,281; 8,616,181; and pending U.S. patent application Ser. Nos. 13/309,460; 13/654,244; and Ser. No. 13/654,248.

With skip fire control, certain firing patterns and/or firing fractions have been shown to provide preferred noise, vibration, and harshness (NVH) characteristics. Thus it is common to limit skip fire operation to a set of available firing patterns or firing fractions that have preferred NVH characteristics. However, limiting skip fire operation to a limited set of available firing patterns/fractions while operating the engine in an optimal manner may result in providing a mismatch between the output torque and the requested input torque command. This problem may be solved by changing engine manifold pressure through incrementally closing/opening the throttle blade or adjusting the cam phaser. Although these methods can provide a matched torque output to input torque command, they come at the expense of increased pumping losses.

Although conventional skip fire control works well to increase fuel efficiency, there are continuing efforts to even further improve engine efficiency.

SUMMARY OF THE DESCRIBED EMBODIMENTS

A variety of methods and devices are described for controlling internal combustion engine cylinder air charge in manners that facilitate the use of different air charge levels in different cylinders or sets of cylinders having cam actuated intake valves.

In one aspect a first set of cylinders is operated in a skip fire manner in which the corresponding cylinders are deactivated during skipped working cycles. Cam actuated intake valves associated with a second set of cylinders are operated differently so that the air charge in the cylinders in the second set is different than the air charge in fired cylinders subject to the skip fire control. In some embodiments, decisions regarding whether the cylinder is in the first or the second set is made on a working cycle by working cycle basis.

In other embodiments, the engine has two banks of cylinders. One bank is operated under skip fire control, and the air charge to cylinders in the second bank (which are not operated under skip fire control) is controlled such that the air charge in the cylinders in the second bank is different than the air charge in the bank operated under skip fire control.

According to another aspect, an engine having cam actuated intake valves is operated in a dynamic firing level modulation mode. During the dynamic firing level modulation operation, the cam actuated intake valves are controlled in at least two different manners to such that different cylinder working cycles have different air charges. That is, fired working cycles in which the intake valves are actuated in the first manner are arranged to have a greater air charge than fired working cycles having their associated intake valves actuated in the second manner, with the respective working cycles being interspersed.

In some such embodiments, decisions regarding whether to operated selected working cycles in the first or second manner are made on an individual cylinder working cycle by individual cylinder working cycle basis. In other embodiments, a first set of the cylinders are operated in a skip fire manner with their active (fired) working cycles having their cam actuated intake valves actuated in the first manner. A second set of the cylinders are fueled and fired during each working cycle and their associated cam actuated intake valves being actuated in the second manner. In other embodiments, the engine is operated in a multiple firing level modulation manner in which none of the working cycles are skipped. In some embodiments, the engine does not include a throttle.

BRIEF DESCRIPTION OF THE DRAWINGS

The embodiments will be readily understood by the following detailed description in conjunction with the accompanying drawings, wherein like reference numerals designate like structural elements, and in which:

FIG. 5A shows a range of exemplary skip fire levels and firing patterns for a V6 engine where the firing fraction is varied from ⅓ to 1.

FIG. 5B is a table showing engine output for a V6 engine operating with cylinder deactivation control on one bank and variable valve lift control on a second bank.

FIG. 5C is a table showing engine output for a V6 engine operating with one cylinder bank that uses skip fire control and another cylinder bank that is controlled using variable valve lift control.

FIG. 7 is a table illustrating the impact of using bank based valve control and skip fire in combination to provide a targeted engine output.

Figure 1:
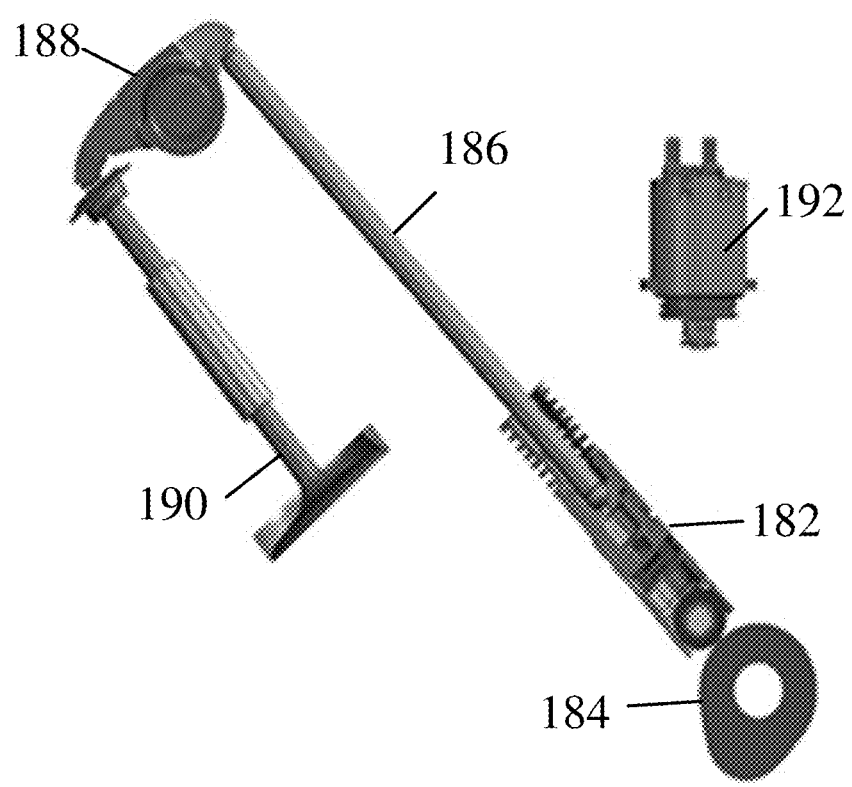
FIG. 1 shows an example of a mechanism used in cam and pushrod valve trains for cylinder deactivation.

It should also be appreciated that the depictions in the figures are diagrammatic and not to scale.

DESCRIBED EMBODIMENTS

In this patent application, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

As discussed above, variable displacement engines deactivate certain cylinders when they are not needed to increase fuel efficiency. Such cylinder deactivation reduces engine pumping losses. Similarly, under skip fire control, skipped cylinders may be deactivated during the skipped firing opportunity to help reduce pumping losses. However, in conventional variable displacement and skip fire control, a throttle is often still used to decrease manifold pressure to match the torque output to torque demand, which can result in some pumping losses (albeit significantly less losses than might be seen using all cylinder operation).

Another known approach for reducing pumping losses is to implement variable valve lift control. Variable valve lift allows precise control of the height and duration of the opening of a cylinder intake valve. Using variable valve lift, the intake valve can be regulated to control the amount of air or air/fuel mixture entering the cylinder. As variable valve lift allows for precise control of the lift of the intake valves, the cylinder mass air charge (MAC) can be controlled entirely by intake valves and there may be therefore no need for a throttle valve in some cases. Without the requirement for a throttle, the intake manifold may also be eliminated in some embodiments. In cases where valve lift control is present, use of a throttle may assist in some air transitions as well as for the purposes of generating vacuum for evaporative emissions (purge) control.

The air charge can also be controlled while reducing pumping losses by controlling the timing at which the valves close relative to bottom dead center of the intake stroke using either early intake valve closure techniques (EIVC) or late intake valve closure (LIVC) techniques—sometimes referred to as operating an engine using an Atkinson or Miller cycle.

Additionally, when torque demand is relatively low, skip fire operation can result in relatively few, high magnitude, torque pulses associated with a cylinder firing. This can sometimes introduce undesirable NVH effects. This potential limitation of skip fire control can be ameliorated through the use of variable valve lift on some of the cylinders to regulate the MAC on selected cylinders. The present invention combines cylinder deactivation with variable valve lift to facilitate engine control in a cost effective, fuel efficient manner that can provide good NVH characteristics. It will be noted that the control, whether skip fire or variable valve lift, can be electronically controlled by the engine control unit (ECU) or some other controller.

Embodiments described herein include an internal combustion engine having a first set of cylinders that can be deactivated and a second set of cylinders that have variable valve lift control or valve intake valve closure timing control. In some embodiments these sets may be coextensive. In some embodiments, the deactivatable cylinders can be operated in a skip fire manner, while in others, they may be shut down individually or as a group for a longer period of time as may be done in conventional variable displacement operation. A combination of variable valve lift and skip fire/valve deactivation strategies enables operation at high intake manifold air pressure at intermediate engine output levels, which can result in improved fuel efficiency while providing desirable NVH characteristics. Skip fire control and variable valve lift control can work cooperatively to substantially minimize pumping loss and optimize cylinder charge to maximize engine fuel efficiency.

It will be noted that there are different methods for deactivating cylinders. For example, the valves may be controlled using an eccentric cam to open and close the valves. A collapsible valve lifter may be incorporated in the valve train to allow deactivation of the valves during a skipped firing cycle. The collapsible lifter is controlled using a solenoid, which in turn may be controlled by the ECU. The solenoid may allow introduction of a working fluid (such as motor oil) into the collapsible lifter to either force the lifter to remain in its fully extended (fixed state) position or allow the lifter to collapse (compressible state), leaving the valve in a closed position. An oil galley including a plurality of oil passageways may be used to deliver the pressurized oil from the solenoid to the collapsible lifter. In many cases the working fluid shifts the position of a locking pin in the collapsible lifter to shift the collapsible lifter between its fixed and compressible state. Pressurized oil applied to the pin allows compression of the collapsible lifter resulting in deactivation of the valve. That is the valve will remain closed as long as pressurized fluid is applied to the collapsible lifter associated with the valve.

FIG. 1 shows an example of a collapsible roller lifter 182 used in an exemplary cam-pushrod valve train. The collapsible roller lifter 182 may use hydraulic control of a lifter pin (not shown in FIG. 1) to cause the lifter 182 to be compressible in the deactivated state. The motion of the cam lobe 184 is thus not transferred to the push rod 186 and is "lost," as the lifter is collapsed. Since the push rod 186 does not transfer the cam lobe 184 motion, rocker arm 188 and engine valve 190 are stationary, resulting in the valve 190 remaining closed or deactivated. An oil control valve 192 may be used to control the hydraulic pressure applied to the lifter pin (not shown in FIG. 1). Although numerous mechanisms are possible for cylinder deactivation, mechanisms that provide for energy efficient deactivation modes are preferred. For skip fire operation, each cylinder that can be activated/deactivated needs a deactivating mechanism and control method. If a group of cylinders is deactivated/activated substantially simultaneously, such as all cylinders in a bank, then only a single control element needs to be used for the entire bank. This has the advantage of minimizing part cost and may reduce the complexity of the control loop.

As noted above, variable valve lift control may be used to control engine output and reduce pumping loss. Numerous variable valve lift mechanisms have been explored, but some efficient and durable mechanisms are those that employ three-bar-link type systems where an eccentric cam can be rotated to vary the effective rocker ratio. The resulting valve lift curves of these mechanisms have demonstrated production feasibility. Examples of such mechanisms developed by BMW and Nissan are shown in FIGS. 2A and 2B respectively.

Figure 2A:
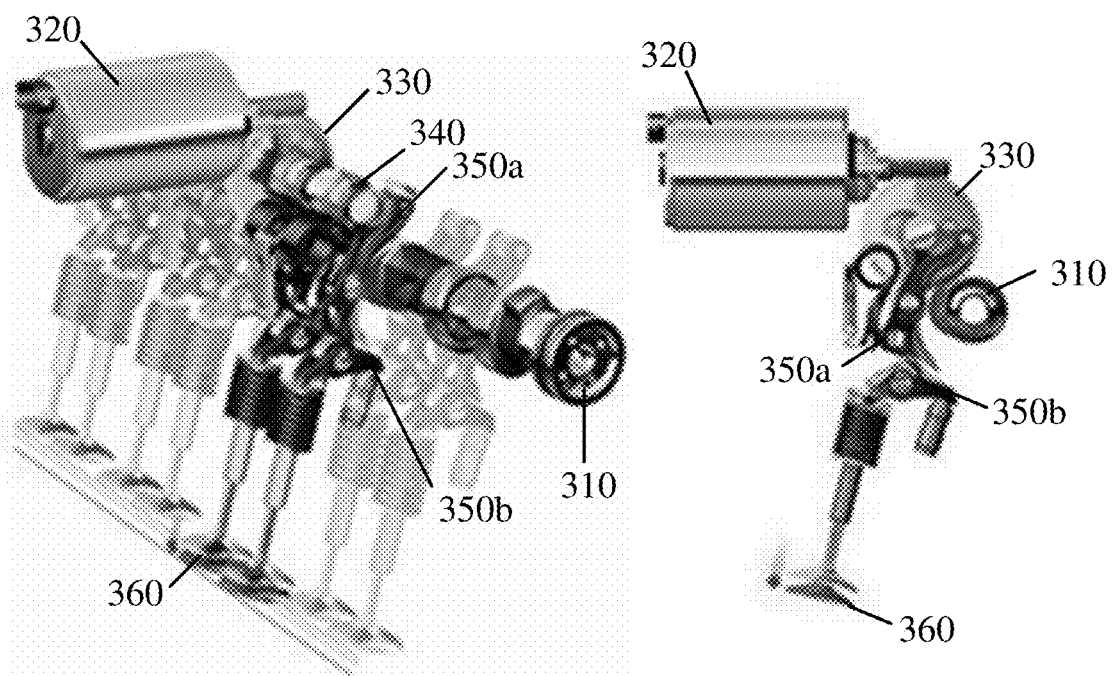
FIG. 2A illustrates an exemplary mechanism used for variable valve lift control.
Figure 2B:
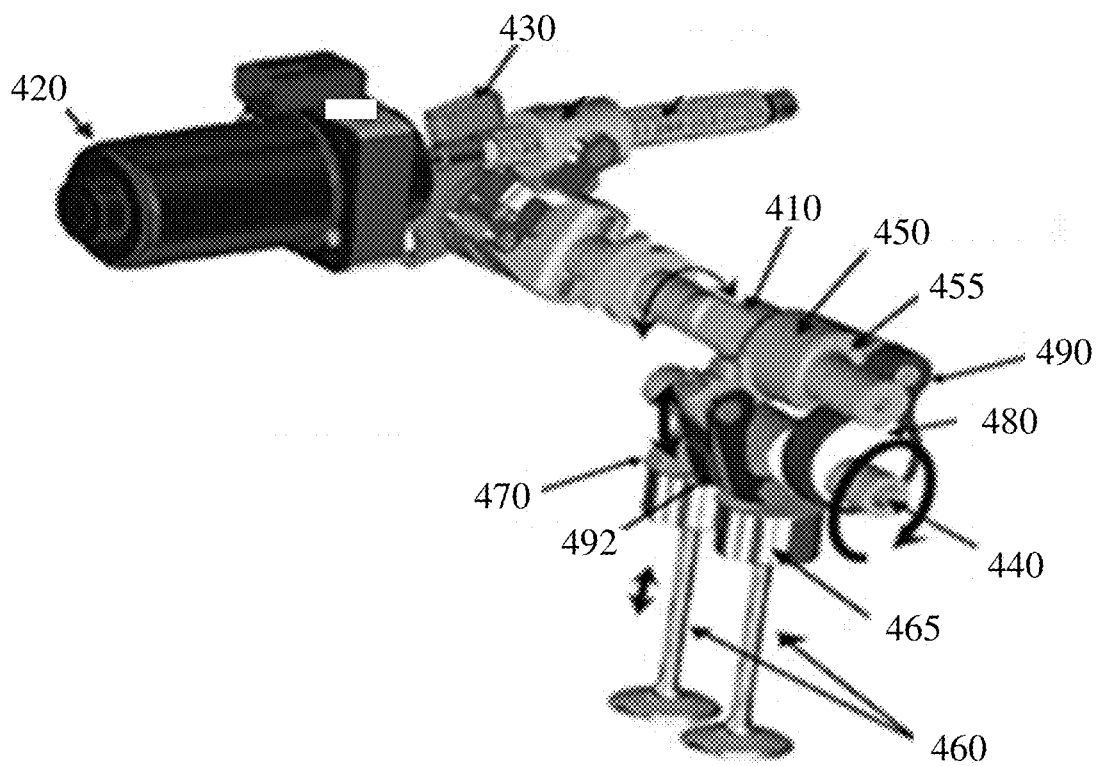
FIG. 2B illustrates another exemplary mechanism used for variable valve lift control.

The mechanisms for variable valve lift control shown in FIGS. 2A and 2B both include an electric motor for controlling the valve lift. FIG. 2A illustrates a mechanism with a perspective view on the left and a side view on the right. The mechanism shown in FIG. 2A employs a conventional inlet camshaft 310, and also uses the rotational output of an electric motor 320 to control the amount of valve lift. The electric motor 320 drives a gear 330, which is connected to an eccentric camshaft 340 and a set of intermediate rocker arms 350a, 350b that extend and retract to adjust the lift of the intake valves 360, as shown in FIG. 2A. The eccentric camshaft 340 causes movement of the intermediate rocker arms 350a, 350b. The intake camshaft 310 also acts on an intermediate rocker arm 350a through roller bearings. When more power is desired, the electric motor 320 turns the eccentric camshaft 340, which pushes on the intermediate rocker arms 350a, 350b, which in turn pushes the valves 360 to open more. The intermediate rocker arms 350a, 350b can pivot on a central point, by means of the eccentric camshaft 340, which is electronically actuated. The movement of the intermediate rocker arms 350a, 350b alone, without any movement of the intake camshaft 310, can adjust lift of the intake valves 360 from fully open (maximum power) to almost closed (idle). In some cases the amount of valve lift may be reduced to zero, such that the cylinder produces no torque and is effectively skipped. Thus, the MAC can be controlled solely by variable valve lift control, while maintaining the intake manifold pressure at or near the ambient atmospheric pressure.

The mechanism shown in FIG. 2B does not use a conventional intake camshaft. Each valve 460 and its corresponding valve lifter 465 are actuated by an oscillating output cam 470 which pivots on, but is not fixed to, a drive shaft 440. Conventional cam phasing typically uses rotation about a camshaft allowing different intake valve opening/closing relative to the piston position; however, in the mechanism shown in FIG. 2B, the cam 470 moves up and down, as shown by the arrows in FIG. 2B. The movement of the cam 470 is driven by the camshaft 440 via several connected components, including an eccentric input cam 480, link A 490, control cam 455, rocker arm 450, and link B 492. The mechanism in FIG. 2B adjusts valve lift using the control shaft 410 inside the rocker arm 450. By rotating the control shaft 410, the position of rocker arm 450 shifts, thereby changing the geometry of link A 490 and link B 492, and also the swing angle of the cam 470. The swing angle of the cam 470 determines the amount of valve lift. As shown in FIG. 2B, the mechanism employs an electric motor 420, which turns the control shaft 410. Also shown in FIG. 2B is a position sensor 430 on an end of the control shaft 410.

Figure 3A:
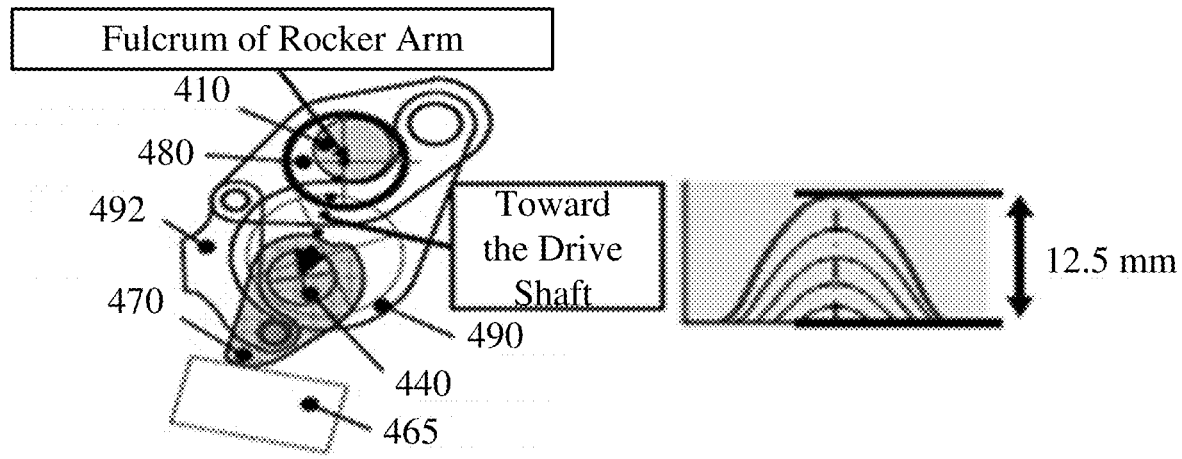
FIGS. 3A and 3B show exemplary valve lift curves for the mechanism shown in FIG. 2B.
Figure 3B:
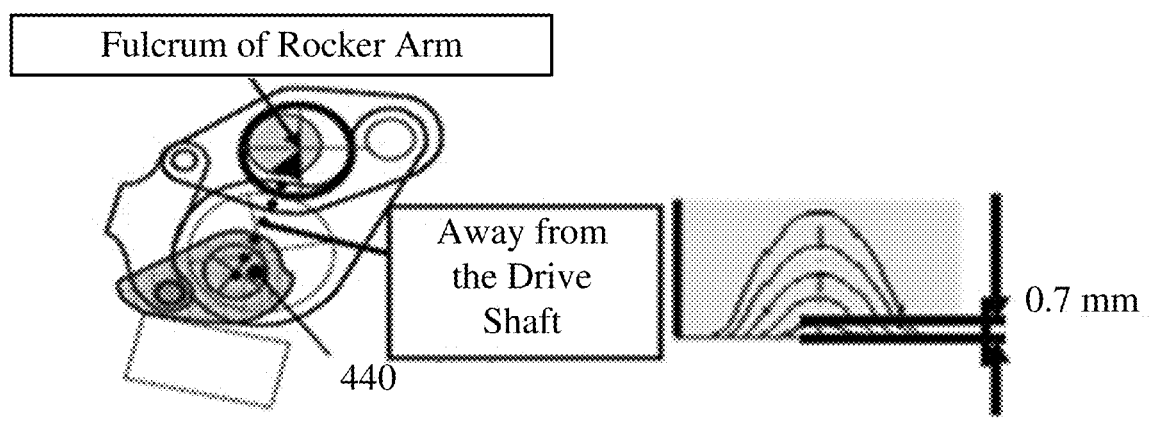

For the mechanism shown in FIG. 2B, as the eccentric input cam 480 is rotated, a family of valve lift curves can be produced from maximum lift (maximum power) to minimum lift (idle operation). FIGS. 3A and 3B shows exemplary valve lift curves for the mechanism shown in FIG. 2B and uses the same numeric designators for the various valve train components. In FIG. 3A, the variable valve adjustment mechanism is configured so that the valve opens to its fullest extended position, which is 12.5 mm in this example. In FIG. 3B, the variable valve adjustment mechanism is configured so that the valve opens as little as possible, 0.7 mm in this example. Intermediate valve lift heights are depicted by the family of valve lift curves shown in FIGS. 3A and 3B. Valve lift curves can be used to optimize cam design. Given the construction of this mechanism, a single fast actuator can be used on a shaft covering all cylinders arranged inline. Application of variable valve lift control to an inline 3, 4 or 6 cylinder engine or a single bank of a V6 or V8 engine is more economical than applications where multiple bank control is required, since only a single mechanism is required.

In addition to variable valve lift and cylinder deactivation, a cam phaser may also be used to control the timing of the opening and closing of a valve relative to crankshaft rotation. The cam phaser works by adjusting the phase relationship between the crankshaft and camshaft. Thus, for engines with cam operated valves all intake valves in a bank can be adjusted simultaneously by the cam phaser. Most modern vehicles dynamically adjust the cam phase angle to optimize engine performance over the variety of operating conditions experienced in everyday driving. It should be appreciated that variable valve lift, cam phase adjustment, and valve deactivation can all be implemented with mechanical systems that are essentially independent of each other. Thus, any line of cylinders may use none of these control systems or any combination of these control systems. Cylinder deactivation may be controlled as a group, for example, all cylinders in a bank, or may be controlled on an individual cylinder basis, using skip fire control.

Figure 4A:
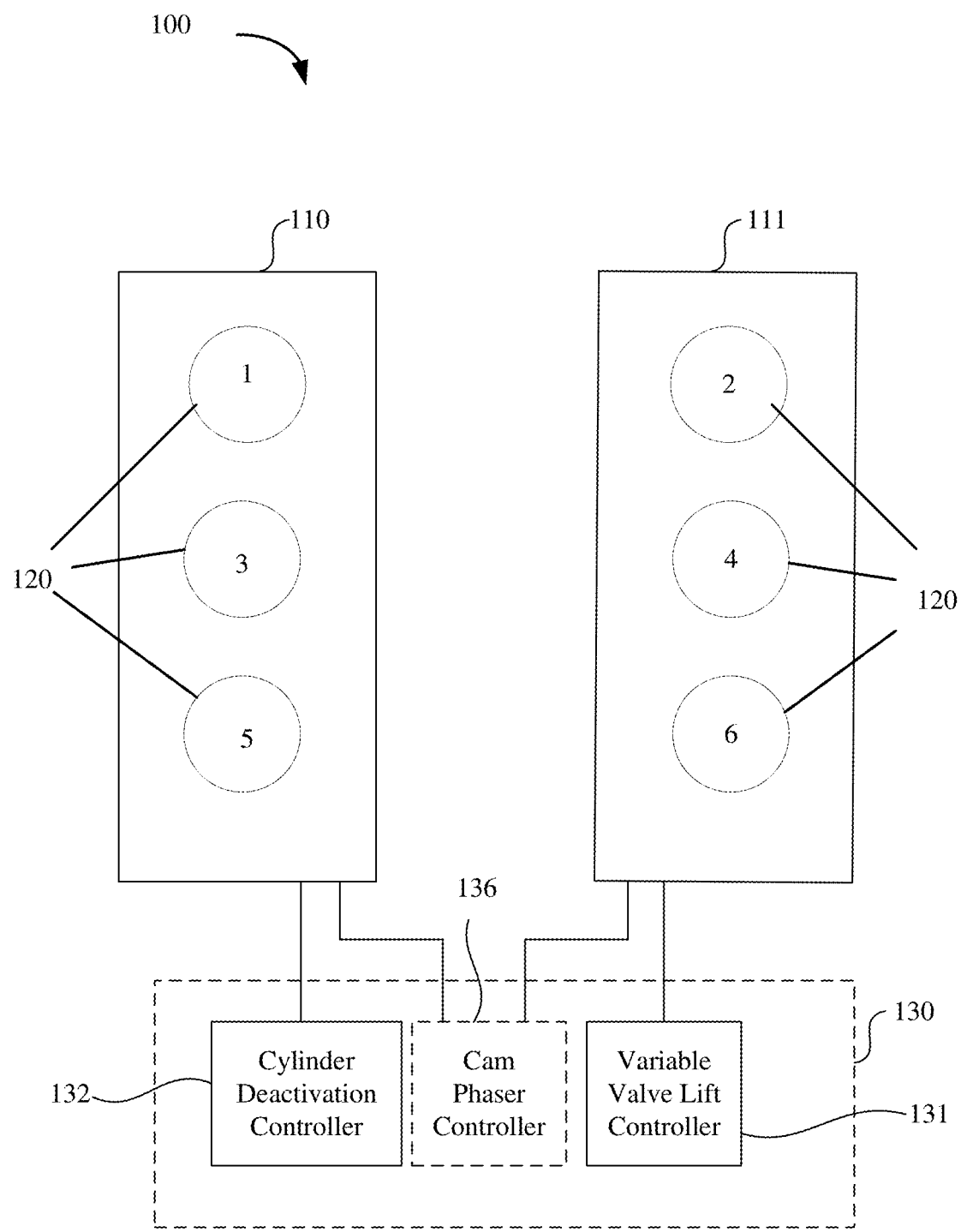
FIG. 4A is a schematic of a system for controlling an exemplary V6 engine in accordance with an embodiment where a single bank of cylinders may be deactivated.

According to an embodiment, an internal combustion engine implements valve deactivation in combination with variable valve lift control. The engine has a V configuration with two banks of cylinders. FIG. 4A is a schematic of a system for controlling an exemplary V6 engine 100 according to an embodiment. In the embodiment shown in FIG. 1A, an internal combustion engine 100 has a V6 configuration with two cylinder banks, a first cylinder bank 110 and a second cylinder bank 111. Each cylinder bank has three cylinders 120. The two cylinder banks 110 and 111 are controlled by the engine control unit 130. The engine control unit may include a variable valve lift controller 131 and a cylinder deactivation controller 132. The two cylinder banks 110 and 111 of engine 100 can thus be separately controlled. In the embodiment shown in FIG. 4A, the first bank of cylinders 110 may have only cylinder deactivation capability and the second bank of cylinders 111 may have only variable valve lift control. Thus, according to this embodiment, the first bank 110 can be deactivated (or activated if needed) using the cylinder deactivation controller 132, while the second bank 111 can be controlled using variable valve lift controller 131 to deliver the required or desired amount of engine output. Both the first bank 110 and/or the second bank 111 may optionally be equipped with a cam phaser controlled by a cam phaser controller 136 to control the intake valve timing. It has been shown that, for a V6 engine, deactivation of one cylinder bank can allow engine operation with acceptable NVH characteristics.

According to an embodiment, the engine control unit 130 activates/deactivates the cylinders 120 on the first bank 110. The lifter associated with cylinders 1, 3 and 5 on the first bank 110 are controlled so as be in their compressible state, which causes the valves on these cylinders to remain closed. The result is operation of the V-6 engine 100 as an inline 3 cylinder engine since the first engine bank 110 is deactivated.

The activated cylinders on the other bank 111 can be controlled to deliver the requested torque. As discussed above, variable valve lift control can be used to control the cylinder charge and the engine output. Advantageously the manifold intake pressure may be maintained at or near the ambient atmospheric pressure to reduce pumping loss and increase efficiency. Only the activated bank of cylinders 111 needs to be capable of variable valve lift control as the other bank 110 is deactivated. In the illustrated embodiment, the engine bank 110 containing cylinders 1, 3, 5 are deactivatable and cylinders 2, 4, 6 on engine bank 111 support variable valve lift control. However, it will be understood that, in another embodiment, the cylinder banks can be reversed with cylinders 2, 4, 6 of bank 111 being deactivatable and cylinders 1, 3, 5, of bank 110 supporting variable valve lift control.

Figure 4B:
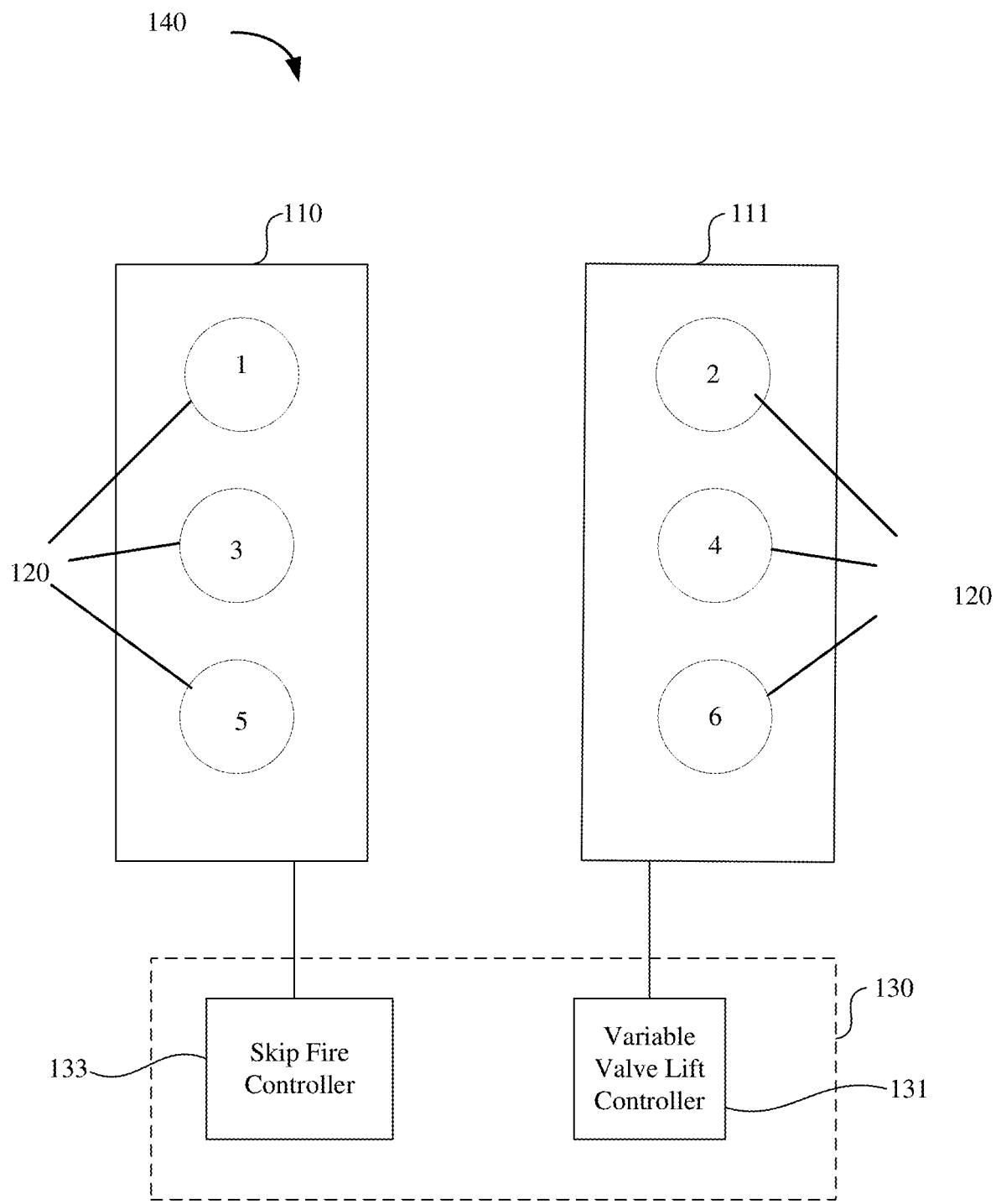
FIG. 4B is a schematic of a system for controlling an exemplary V6 engine in accordance with an embodiment where a single bank of cylinders operates with skip fire control.

FIG. 4B shows an embodiment where a V6 engine 140 uses a skip fire controller 133 to control a first bank of cylinders 110. The skip fire controller allows the selective firing or skipping of at least one cylinder on the first bank of cylinders 110. In some cases all the cylinders on the cylinder first bank 110 may be controlled in a skip fire manner. The second cylinder bank 111 is controlled by a variable valve lift controller 131. Both the variable valve lift controller 131 and the skip fire controller 133 may be situated in the ECU 130. Both the first bank 110 and/or the second bank 111 may optionally be equipped with a cam phaser to control the intake valve timing (not shown in FIG. 4B). Any mechanical or electro-mechanical system may be used to deactivate the valves on bank 110 and provide variable lift for the valves on bank 111.

An advantage of the engine design shown in FIGS. 4A and 4B is that it reduces the cost for the control assemblies, since both cylinder deactivation and variable valve control do not have to be implemented on all cylinders. Each bank has different methods of control and control strategies, but the banks work in concert to deliver the requested engine output.

In yet another approach, the V6 engine 170 has all cylinders capable of both deactivation and variable valve control. A variable valve lift controller 131*a* and a skip fire controller 133*a* control cylinder bank 110. A variable valve lift controller 131*b* and a skip fire controller 133*b* control cylinder bank 111. Both the variable valve lift controllers 131*a* and 131*b* and skip fire controllers 133*a* and 133*b* may be situated in the ECU 130. Both the first bank 110 and/or the second bank 111 may optionally be equipped with a cam phaser to control the intake valve timing (not shown in FIG. 4C). In should be appreciated that in some embodiments a cylinder deactivation controller may be substituted for one or both of the skip fire controllers 133*a* and 133*b*. The cylinder deactivation controller will allow all cylinders in a bank to be deactivated essentially simultaneously.

Figure 4C:
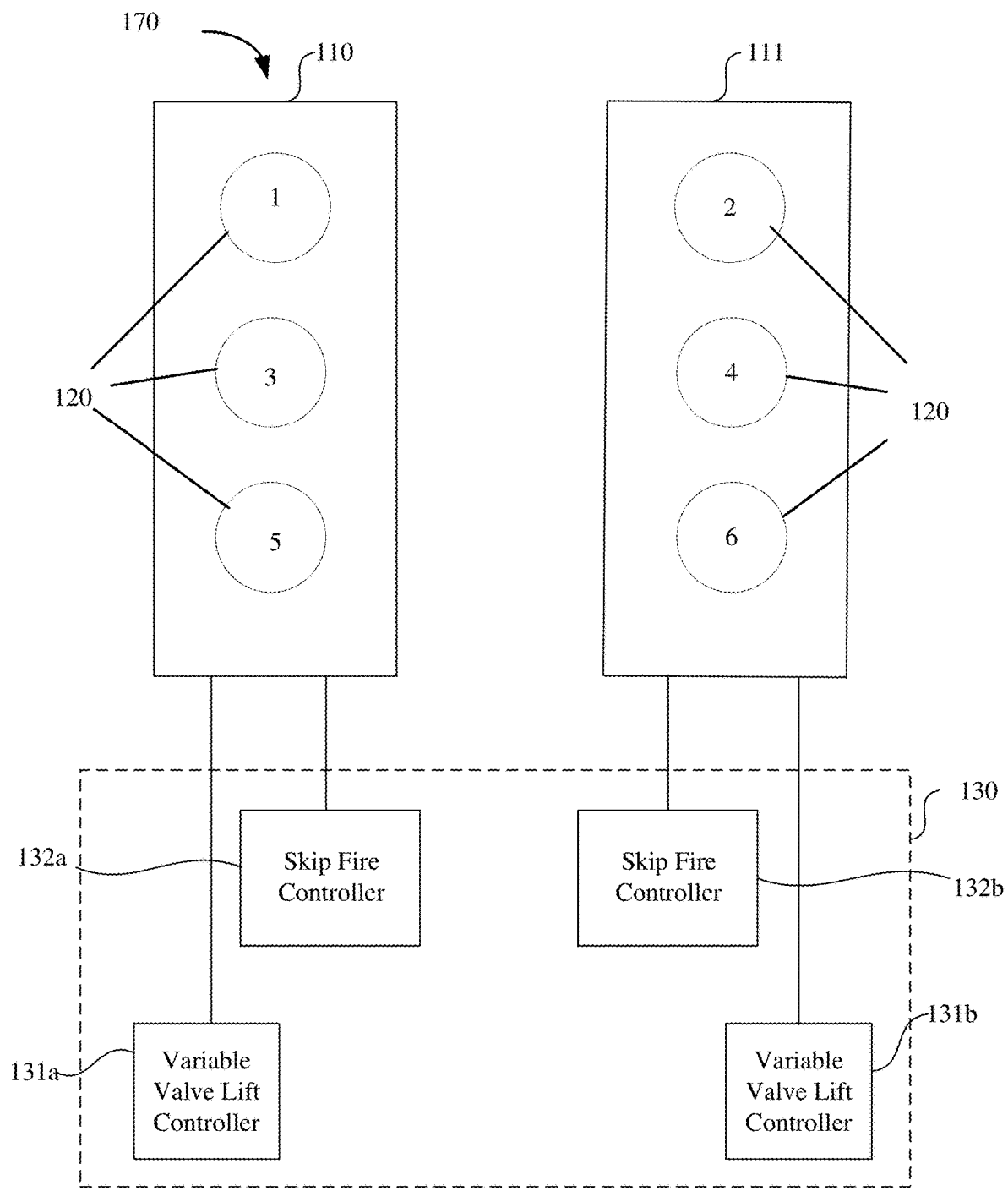
FIG. 4C is a schematic of a system for controlling an exemplary V6 engine in accordance with an embodiment where both cylinder banks operate with both variable valve lift and skip fire control.
Figure 4D:
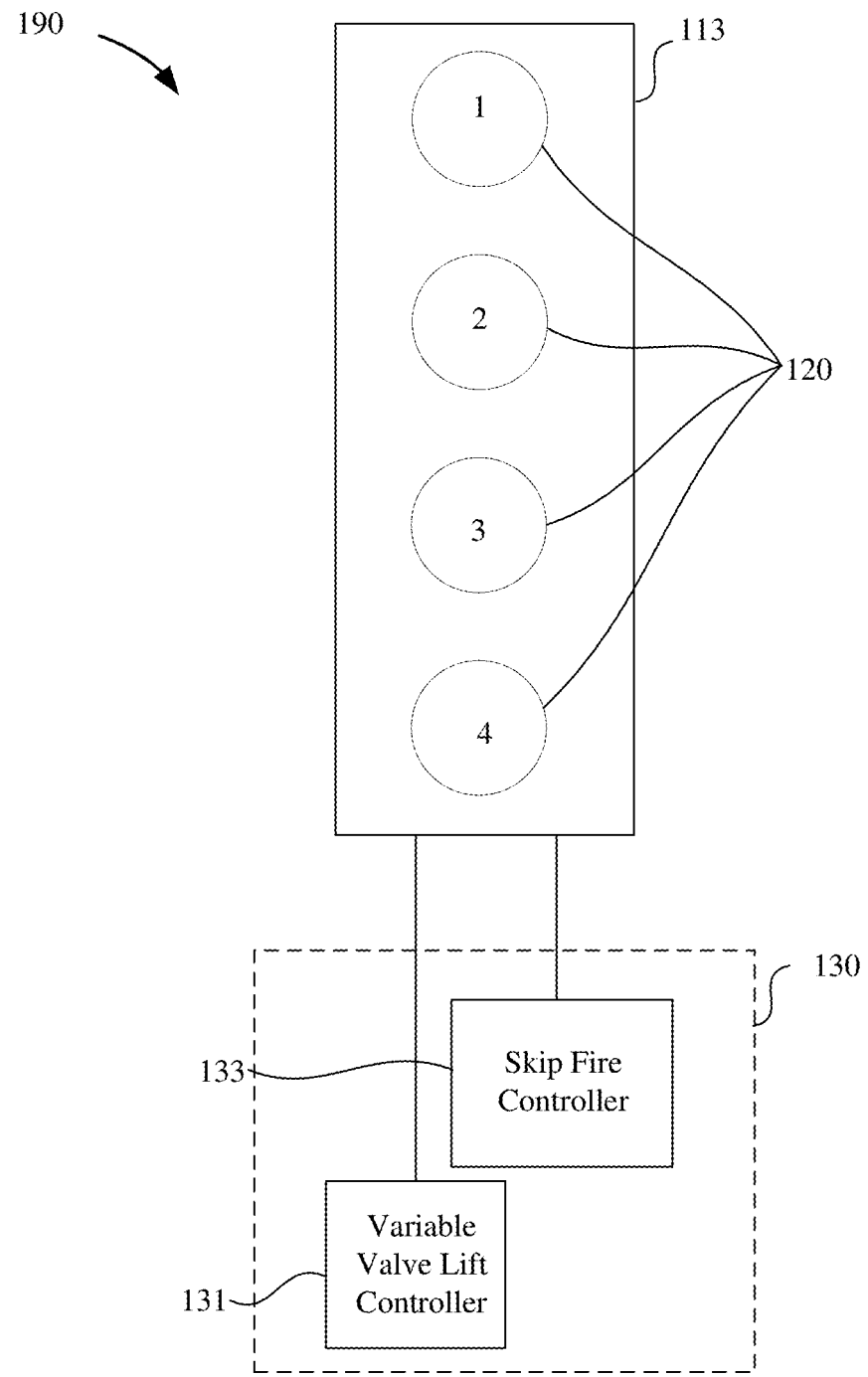
FIG. 4D is a schematic of a system for controlling an in-line, 4 cylinder engine in accordance with an embodiment where a cylinder bank operates with both variable valve lift and skip fire control.

FIG. 4D shows an embodiment for an inline 4 cylinder engine 190. The skip fire controller 133 allows the selective firing or skipping of at least one cylinder on the single cylinder bank 113. In some cases all the cylinders on the cylinder bank 113 may be controlled in a skip fire manner. Both the variable valve lift controller 131 and the skip fire controller 133 may be situated in the ECU 130. The cylinder bank 113 may optionally be equipped with a cam phaser to control the intake valve timing (not shown in FIG. 4D). Any mechanical or electro-mechanical system may be used to deactivate the valves and provide valve variable lift. It should be appreciated that use of a 4 cylinder inline engine is exemplary only and that the invention may be applied to inline engines having any number of cylinders in a single bank, such as 2, 3, 5, and 6 cylinder inline engines.

In another embodiment, the intake valves of all of the cylinders 120 on both cylinder banks 110 and 111 of the engine 100 are regulated by variable valve lift control capable of zero valve lift. It will be appreciated that a cylinder with an intake and/or intake and exhaust valve at zero lift is effectively deactivated. In this embodiment, one of the cylinder banks can be deactivated by setting the valve lift for those cylinders to zero and the other cylinder bank is controlled using variable valve lift control so that the delivered engine output matches the requested engine output.

A range of exemplary skip fire levels for an exemplary V6 engine is shown in table 500, FIG. 5A, where the firing fraction is varied from 0 to 1 using all denominators having values less than or equal to 9. Table 500 shows there are 29 distinct firing fractions. Table 500 is constructed so that all the firing patterns correspond to patterns with a most equal spacing between firing. That is, within any given pattern, the spacing between successive firings can differ by no more than one skip. These types of pattern have generally been found to yield better NVH characteristics compared to firing patterns with more uneven firing distributions. It should be appreciated however that there may be circumstances where operation with patterns having a non-uniform firing distribution yield acceptable NVH characteristics.

Some of these firing fractions have multiple distinct patterns. For example, at a firing fraction (FF) of one half (FF=½), the engine can operate in two different sequences 501 and 502. For a firing fraction of ⅙, the engine can operate in six different sequences, 503, 504, 505, 506, 507, and 508. In sequence 501 the engine will be firing cylinders 1, 3, and 5. In sequence 502 the engine will be firing cylinders 2, 4, and 6. In sequence 501 only the left bank is firing (denoted by LLL) 510 and in sequence 502 only the right bank is firing (denoted by RRR) 512. Similarly, for each sequence 503-508 the engine will be operating on only a single bank. Under skip fire control operating at FF=½, the engine effectively has one cylinder bank deactivated and one bank activated. The activated bank can be regulated using variable valve lift control, as discussed above. The deactivated bank can be deactivated by either a cylinder deactivation controller or a skip fire controller depending on the engine design.

For an embodiment with the V6 engine operated under skip fire control and with one cylinder bank subject to variable valve lift control, various control options are available. For example, in order to achieve a lower torque level, either the firing fraction, valve lift, or some combination of both may be reduced. For example, consider a 6 cylinder engine with a requested torque output of ⅙ the maximum engine output. To achieve this output a FF=⅙ can be commanded, where the fired cylinder receives its maximum cylinder charge. This same level of output torque can also be achieved using variable valve lift control by running a FF=½, yielding three cylinder firings with the valve lift area commanded to ⅓ of the full mass air charge (MAC). Obviously, the firing cylinders can be charged at an intermediate level between these values. This strategy may provide benefits in vibration and acoustic performance since each cylinder firing produces less of a torque impulse when the charge is smaller. Substantially the same output torque can be provided by operating all cylinders (FF=1) with variable valve lift such that the per cylinder MAC or cylinder charge is ⅙. Using this type of combined control allows operation at both a favorable firing fraction from an NVH perspective and a favorable cylinder load from a thermodynamic efficiency perspective. Since the cylinder load is controlled by use of variable lift valves the intake manifold pressure may remain at or near ambient atmospheric pressure, minimizing pumping losses. This strategy could be extended to provide any desired level of engine output. The per cylinder load or MAC may be chosen such that each firing cylinder operates at or near its maximum thermodynamic efficiency. This control strategy will maximize fuel economy, since it minimizes or eliminates pumping losses and operates each firing at its maximum efficiency.

Adaptive valve lift may be used to compensate for sub-optimal manifold and/or purge vapor distributions inside the manifold. Valve lift differences per bank may include an adaptive correction, which may force different banks to different valve lifts, in order to assure best air or air/fuel vapor mixture distribution corrections. In practice, this changes the target control point of one bank's valve lift to account for differences in flow from one bank vs. the other. It may also account for mal-distributions in purge vapor entering the intake manifold, where the geometry and air entrainment of entering fuel vapor may favor one bank over the other. Adaptive targets for the valve lift may help compensate to provide more equal distribution between banks of cylinders.

Consider an engine as shown in FIG. 4A operating with its intake manifold at or near atmospheric pressure. In this case each cylinder may intake a maximum MAC with the appropriate valve settings. If all cylinders are fired (for example, by commanding the first bank to be fired), FIG. 5B shows that the output from the first cylinder bank (cylinders 1, 3, 5) produces 0.5 of the maximum engine output. The command valve lift for the second cylinder bank (cylinders 2, 4, 6) can be reduced incrementally from one (full engine output) to zero, resulting in engine output reducing from maximum to one half of its maximum value. To operate below an engine output of ½, the first bank of cylinders can be deactivated, resulting in a firing fraction of ½, and the second bank can be operated with 100% valve lift command. To reduce from an engine output of one half to zero, the valve lift command for the second bank is reduced to the desired level so that the requested engine output is delivered.

This type of control may be refined by adjusting the intake manifold pressure (MAP) and/or controlling an optional cam phaser on the first bank having cylinder deactivation. In this case the first bank no longer needs to operate with a full cylinder charge. For example, it may be possible to reduce the MAC on the first bank by up to approximately 40% using only a cam phaser and maintaining the MAP at or near atmospheric pressure. If the MAP is reduced, for example, by using a throttle, the second bank will also no longer be able to operate at full cylinder charge. A throttle and/or use of a cam phaser can be incorporated into an engine control algorithm in addition to cylinder deactivation on bank 1 and variable valve control on bank 2. While partially closing the throttle will engender some pumping losses, these losses can be minimized by only closing the throttle a small amount. The throttle may be closed so that the MAP is less than 20 kPa, 10 kPa, 5 kPa, or 2 kPa below the ambient atmospheric pressure. Alternatively, the MAP may be maintained at some substantially fixed pressure near the ambient atmosphere, such as 95 kPa, 90 kPa, 85 kPa, 80 kPa, or 75 kPa. The choice of the MAP may depend on the ambient atmospheric pressure. For example, at high elevations the ambient atmospheric pressure may be below 90 kPa, in which case a lower MAP target value may be used as the control set-point.

In another embodiment, an internal combustion engine has one bank of cylinders controlled by skip fire control and another bank of cylinders separately controlled using variable valve lift control as shown in FIG. 4B. In this embodiment, the two cylinder banks can be individually controlled to deliver the required amount of torque. As shown in the table of FIG. 5C, adjusting and combining skip fire control on the cylinders 120 of one bank 110 and variable valve lift control on the cylinders 120 of the other bank 111 can result in varying amounts of total engine output to produce the required output torque. The bank 110 firing fraction can vary between 0 and 1, while the bank 111 firing fraction is fixed at 1 (only variable valve lift control). This table assumes that the MAP is at or near atmospheric pressure and that the cam phaser on deactivatable cylinders (bank 1) is adjusted to maximize cylinder charge. Inspection of FIG. 5C reveals that the same engine output can be achieved with a wide variety of different contributions from the first cylinder bank and second cylinder bank. The combination which provides the maximum fuel efficiency, consistent with producing an acceptable NVH level may be used for engine operation. In some cases this will correspond to situations where a maximum cylinder charge is not used on bank 110. The cylinder charge may be reduced by using a cam phaser or reducing the intake manifold pressure. It will be understood that, for simplicity, the tables shown herein provide only certain firing fractions for skip fire control and only certain valve lifts for variable valve lift control. In practice, the valve lift can be controlled incrementally, so that the engine can produce a smoothly varying torque output.

In an embodiment, for example, the inline 4 cylinder engine shown in FIG. 4D, variable valve lift control may be applied in conjunction with skip fire control. This combination allows the engine output to vary smoothly across its entire operating range by adjusting the valve lift in combination with the firing fraction. A smooth change in the engine output can be obtained by decreasing the valve lift substantially simultaneously with increasing the firing fraction. Likewise, a smooth change in the engine output can be obtained by increasing the valve lift substantially simultaneously with decreasing the firing fraction. The degree of valve lift and firing fraction can be controlled to operate the engine with maximum fuel efficiency. For example, if a desired firing fraction yields a slightly unacceptable NVH level, the next higher firing fraction may be commanded and the MAC is matched by reduction of the valve lift. This achieves the torque output goal, without the fuel economy penalty associated with throttling the engine.

Although some of the embodiments herein are described with reference to a V6 engine, it will be understood that the deactivation, skip fire, and variable valve lift combinations can be applied to other engines having different configurations and cylinder counts. It should be appreciated that any firing command subset can be used independent of any cylinder count in an engine. Such structure can be defined based on the methodologies described herein at the desire/convenience of the control structure. As discussed above, skip fire control or valve deactivation can be implemented in conjunction with variable valve lift control to increase efficiency by reducing pumping losses.

In an embodiment, an engine can have both variable valve lift and valve deactivation technology. An engine with variable valve lift control and valve deactivation capability provides for an engine that can be operated at an intermediate torque level, which allows the firing fraction or firing density to be at a higher desired level for NVH while still maintaining high intake manifold pressure by utilizing variable valve lift on the firing cylinders to match the cylinder charge to the requested torque level. According to an embodiment, an internal combustion engine is provided with at least one cylinder capable of variable valve lift control and at least one cylinder capable of valve deactivation or skip fire control. It will be noted that a shorter or lower valve lift can have the same effect as operating fewer cylinders.

In the embodiments described herein, the throttle may be eliminated in some cases. As noted above, in some embodiments, the intake charge can be controlled entirely by the intake valves with variable valve lift and there is no need for a throttle valve to control the intake manifold pressure. As discussed above, although the throttle valve can be used to reduce engine intake manifold pressure to match torque output to input torque command, pumping losses are increased. Thus, the use of the throttle valve to control intake is not generally as desirable as using variable valve lift control.

Figure 6:
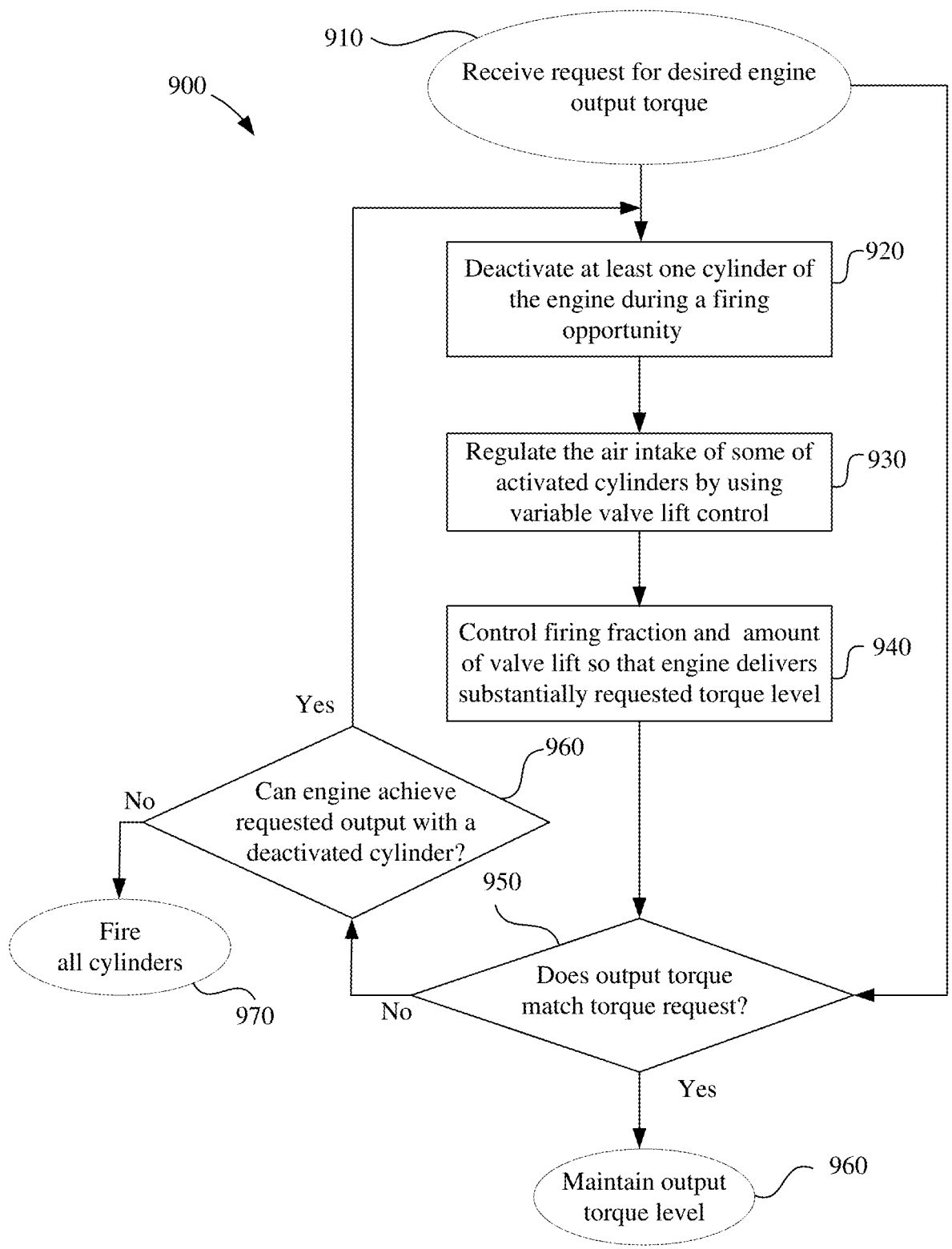
FIG. 6 is a flow diagram of a method of controlling an internal combustion engine using a combination of skip fire and variable valve lift control.

FIG. 6 is a flow diagram of a method 900 of controlling an internal combustion engine using a combination of skip fire and variable valve lift control. In 910, an internal combustion engine capable of skip fire and variable valve lift control receives a request to output a requested torque level. The torque request may be at least partially derived from the position of an accelerated pedal controlled by a vehicle driver. In 920, a skip fire controller selects a firing fraction less than one such that at least one cylinder of the internal combustion is deactivated during a firing opportunity. In 930, a variable valve lift controller is used to regulate the air intake for at least one activated cylinder of the engine. In 940, the firing fraction and valve lift are controlled so that the engine substantially delivers the requested output torque. In 950, the delivered output is compared against the requested torque. If the two values are substantially the same, method 900 proceeds to step 960 where the current output torque is maintained. If the two values are substantially different, the method proceeds to step 960. In 960, a determination is made whether the requested torque can be delivered with a firing fraction less than one, i.e. a deactivated cylinder. If a firing fraction of one is required to deliver the requested torque the method moves to step 970 where all cylinders are fired. If the requested torque can be delivered with a firing fraction less than 1, the method proceeds back to step 920. The firing fraction and valve lift are then adjusted so that the engine output torque substantially matches the requested torque as previously described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings. For example, at step 950 additional criteria may be used in deciding whether to remain operating with the same firing fraction. Such criteria may include operation with an acceptable NVH level.

The method described in FIG. 6 can be repeated regularly during engine operation. For example, the method could be implemented at every firing opportunity, every second firing opportunity, every engine cycle, or some other interval that allows responsive engine operation. The firing fraction and degree of valve lift are thus regularly updated so that the engine output substantially matches the driver requested output.

Yet another embodiment will be described with reference to the table of FIG. 7. The illustrated embodiment contemplates using a V6 engine as shown in FIG. 4C with cylinders arranged with bank 1 comprised of cylinders 1,3,5 and bank 2 of cylinders 2,4,6 and operated with a firing order of 1,2,3,4,5,6. In this example we further constrain the valve lift control to be established by cylinder bank so that all the cylinders within each bank are commanded to the same level, but the level for either bank may vary.

With this construct a plurality of equivalent engine output levels can be achieved as a function of firing fraction, firing sequence, and bank lift control as depicted on FIG. 7. If the engine operates at a firing fraction of 1 on banks 1 and 2 and with lift control of 1 we obtain full engine output represented by 1 in the first row of FIG. 7. If we desire to operate the engine at half of the maximum output level we can continue to operate at a firing fraction of 1 and set both bank lift controls to 0.5 as shown in row 2. This output level can also be achieved by maintaining bank 1 lift control at 1 and setting bank 2 lift control at 0 as shown in row 3. The same output can be achieved swapping the bank lift control settings as shown in row 4. Both settings effectively deactivates a bank of cylinders. An equivalent engine output level can be achieved by operating the engine at a firing fraction of ½ and selecting the firing sequence to skip the cylinders of bank 1 or bank 2 as shown in rows 5 and 6. To maintain an engine output at 0.5, as firing fraction increases above ½ lift control of at least one bank must be lower than 1. Row 7 illustrates this concept with a firing fraction at ⅔ and both bank lift controls set to 0.75, achieving the desired level engine output at 0.5. This engine output level can also be achieved by lowering bank 1 lift control to 0.5 and raising bank 2 lift control to 1 as shown in row 8. The bank lift control can be swapped to achieve the same result as shown in row 9. This symmetry occurs because for all three firing sequences for a firing fraction of ⅔ have an equal number of operating cylinders per bank as shown in FIG. 7. If for NVH or other reasons it is desired to operate at a higher firing density we can calculate the lift control required using the equation:

Engine Output=Firing Fraction*Lift Control.

For example, if we want a firing fraction of ¾ and we can set lift control equal to 0.667 to maintain a 0.5 target engine output as shown in row 10. At this firing fraction there are two possible firing sequences each requiring two engine cycles to complete. In this case the number of firing events per engine cycle varies between 4 and 5. Averaging over two cycles achieves the desired 0.5 engine output for either firing sequence as shown in rows 10 and 11.

If we want to vary the valve lift control by bank we can calculate possible settings using the following relationship:

Engine Output=# Fired Cylinders Bank 1*Lift Control 1+# Fired Cylinders Bank 2*Lift Control 2.

This can alternatively be expressed as:

Engine Output=(Engine Cycle 1 Output+Engine Cycle 2 Output)/2.

For example, using a firing fraction equal to ¾, having a firing sequence of 2,3,4,5:1,2,4,5,6 and setting bank 1 lift control to 0.75 we must set bank 2 lift control to 0.625 to maintain a 0.5 engine output as shown in row 12. However, with the same firing fraction of ¾ and switching to an alternative firing sequence of 1,2,3,5,6:1,3,4,5 yields an engine output of 0.531, exceeding our target output as shown in row 13. This change in engine output results from different firing sequences for a firing fraction of ¾ having differing numbers of firing cylinders per bank. This situations contrasts with a firing fraction of ⅔ where each of the three possible firing sequences yield an equal number of firing cylinders per bank (two cylinders in this case). To maintain a target engine output at 0.5 with bank 1 lift control at 0.75 we can calculate that a bank 2 lift control of 0.5 is required (row 14). Alternatively, if we want to maintain bank 2 lift control at 0.625, bank 1 lift control must equal 0.6875 as shown in row 15. Inspection of the table presented in FIG. 5A reveals the firing fractions of ⅛, ⅙, ¼, ⅜, ½, ⅝, ¾, ⅚, and ⅞ would likewise differ in engine output when differing lift control settings by bank are applied.

This illustrative example reveals that operating engine output is a function of firing fraction and bank lift control and maybe a function of firing sequence when lift control varies by cylinder bank. It is also clear that a multitude of operating setting points for firing fraction, firing sequence, and bank 1 and bank 2 lift control are available for an equivalent engine output target. Engine operating conditions of the previous engine cycle may make a specific setting combination more desirable. Potentially engine operating characteristics for fuel consumption or NVH may also be optimized by comparing among the different operating setting choices available. It is clear this construct could be extended to different cylinder counts and cylinder bank configurations, as well as varying constrained lift control such as two position valve lift or unconstrained lift control allowing all cylinders complete flexibility.

In the example of FIG. 7, variable valve lift control is used to control the air charges used in the first and second cylinder banks, with each bank being independently controlled. It should be appreciated that the air charge in the cylinders can also be controlled by varying cam phase of the opening and closing of the intake valves. That is, the intake valves can be opened early relative to end of the intake stroke (i.e., bottom dead center) or late relative to the end of the intake stroke. Early closure of the intake valves is sometimes referred to as EIVC (early intake valve closure) operation of the valves and late closure of the intake valves is sometimes referred to LIVC (late intake valve closure). With EIVC operation, the intake valves are closed earlier than they would be to induct the largest volume of air, thereby reducing the air charge in a controlled manner. With LIVC operation, the intake valves are closed later than they would be, which causes a certain amount of the air inducted into the cylinder to be expelled back out through the intake valve, which has the same effect of reducing air charge in a controlled manner. In both EIVC or LIVC valve operation, the air charge can be controlled by controlling the camshaft phase using a cam phaser or other suitable mechanism. In other embodiments, a cylinder may have two are more intake valves. The two or more valves may be controlled differentially to decrease or increase cylinder air charge. Therefore, in alternative embodiments camshaft phase control and/or differential valve operation can be used in place of camshaft lift control to vary the air charge inducted into each cylinder. In the embodiment of FIG. 7, this can be done on a per bank basis such that the air charge used in each cylinder within each bank is generally consistent. Similarly, cam phase control and/or differential valve operation can be substituted for cam lift control in any of the other embodiments as well as long as the cam phaser (or other mechanisms used to adjust air charge) are capable of modulating the air charge at a frequency and modulation depth suitable for use in such embodiments.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the inventions have been described in terms of particular embodiments, there are alterations, permutations, and equivalents, which fall within the scope of these general concepts. While many of the embodiments of the current invention have been described as operating all firing cylinders in a bank with a substantially equal air charge, it should be appreciated that the cylinders may be grouped in different ways. For example, in an in-line engine the outermost cylinders may form one cylinder group and the inner cylinders another group. Also, many of the described embodiments contemplate operating a subset of the cylinders in a dynamic skip fire operational mode. However, it should be appreciated that the described techniques are also well suited for use in conjunction with other types of dynamic firing level modulation operation. For example, in some applications referred to as dynamic multi-level skip fire, individual working cycles that are fired may be purposely operated at different cylinder outputs levels—that is, using purposefully different air charge and corresponding fueling levels. By way of example, U.S. Pat. No. 9,399,964, which is incorporated herein by reference, describes some such approaches. The individual cylinder control and cylinder set control concepts described herein can also be applied to dynamic multi-charge level engine operation in which all of the cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis.

In dynamic skip fire and various other dynamic firing level modulation engine control techniques, an accumulator or other mechanism may be used to track the portion of a firing that has been requested, but not delivered, or that has been delivered, but not requested. However, the described techniques are equally applicable to engines controlled using other types of skip fire or firing level modulation techniques including various rolling cylinder deactivation techniques. Similar techniques may also be used to manage the air charge in variable stroke engine control in which the number of strokes in each working cycle are altered to effectively vary the displacement of an engine.

It should also be noted that there are alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A method of operating an internal combustion engine having a plurality of cylinders, each cylinder having at least one associated intake valve and an associated exhaust valve, the intake and exhaust valves being cam actuated, the method comprising:
   directing skip fire operation of the engine, wherein during the skip fire operation of the engine, at least one of the cylinders (i) is deactivated during selected skipped cylinder working cycles such that air is not pumped through the cylinder during the skipped cylinder working cycles, and (ii) selected active cylinder working cycles are fueled and fired, and (iii) the skipped and active working cycles are interspersed while the engine is operating at a first effective displacement; and
   controlling the intake valves associated with at least two of the fired cylinder working cycles differently such that a first air charge associated with a first one of the cylinder working cycles is greater than a second air charge associated with a second one of the cylinder working cycles during a selected engine cycle in which neither the first or second cylinder working cycles are skipped, whereby the skipped working cycles, cylinder working cycles having the first air charge and cylinder working cycles having the second air charge are all interspersed while the engine is operating at the first effective displacement.

2. The method of claim 1, wherein the internal combustion engine has an intake manifold, the intake manifold pressure being maintained substantially constant pressure selected of at least 75 kPa.

3. The method of claim 1, wherein the internal combustion engine has no intake manifold.

4. The method of claim 1, wherein:
   the engine has two banks of cylinders;
   the air charge to cylinders in a first bank of the two banks of cylinders is controlled using skip fire control while cylinders in a second bank of the two banks of cylinders have their air charge controlled using a cam phaser and are not controlled using skip fire control.

5. The method of claim 4, wherein the skip fire control and cam phaser control work cooperatively to substantially maximize fuel efficiency.

6. The method of claim 1, wherein the engine has a single line of cylinders.

7. The method of claim 6, wherein the engine has four cylinders.

8. The method of claim 1, wherein:
   the engine has two groups of cylinders, the first cylinder being in the first group and the second cylinder being in the second group; and
   the two groups of cylinders have different nominal air charges.

9. The method of claim 8, wherein for at least some of the cylinders, decisions regarding whether the cylinder is in the first or the second group is made a working cycle by working cycle basis.

10. The method of claim 1, wherein first cylinder is operating at substantially maximum power.

11. The method of claim 1, wherein the second cylinder is operating at substantially optimal fuel efficiency.

12. A method of operating an internal combustion engine having a plurality of cylinders, each cylinder having at least one associated intake valve and an associated exhaust valve, the intake and exhaust valves being cam actuated, the method comprising:
   directing dynamic firing level modulation operation of the engine, wherein during the dynamic firing level modulation operation of the engine, the cam actuated intake valves are controlled in at least two different manners, wherein cylinder working cycles having their associated cam actuated intake valves actuated in a first manner have a greater air charge than cylinder working cycles having their associated cam actuated intake valves actuated in a second manner, and wherein cylinder working cycles having their associated cam actuated intake valves actuated in the first and second manners are interspersed.

13. A method as recited in claim 12 wherein decisions regarding whether to operated selected working cycles in the first or second manner are made on an individual cylinder working cycle by individual cylinder working cycle basis.

14. A method as recited in claim 12 wherein:
a first set of the cylinders are operated in a skip fire manner in which cylinders in the first set of cylinders (i) are deactivated during selected skipped cylinder working cycles such that air is not pumped through the associated cylinder during the skipped cylinder working cycles, and (ii) are fueled and fired during selected active cylinder working cycles; and
during the active cylinder working cycles, the associated cylinders' cam actuated intake valves are actuated in the first manner.

15. A method as recited in claim 12 wherein:
a second set of the cylinders are fueled and fired during each working cycle; and
the cam actuated intake valves associated with the second set of cylinders are actuated in the second manner.

16. A method as recited in claim 12 wherein the method is performed while the engine is operating in a multiple firing level modulation manner in which none of the working cycles are skipped.

17. A method as recited in claim 12 wherein the engine does not include a throttle.

18. An internal combustion engine comprising:
a plurality of cylinders, each cylinder having at least one cam actuated intake valve;
at least one valve deactivator, each valve deactivator being arranged to individually deactivate an associated single one of the plurality of the cylinders on an individual working cycle basis independent of whether any of the other cylinders are deactivated during the same working cycle;
an engine controller including a skip fire controller arranged to direct skip fire operation of a first set of the cylinders, each of the cylinders in the first set of cylinders being deactivatable; and
a cam actuated valve control system arranged to alter a valve actuation parameter for at least one of the cylinders to facilitate varying an air charge for such at least one of the cylinders; and
wherein the engine controller is further arranged to, during at least one operational state of the engine in which the first set of cylinders is operated in a skip fire manner, direct the cam actuated valve control system to cause a second set of cylinders that is different from the first set of cylinders to intake an air charge that is different from an air charge utilized during fired working cycles of the first set of cylinders operated in the skip fire manner.

19. An internal combustion engine as recited in claim 18 wherein all cylinders are capable of both valve deactivation and variable valve control.

20. An internal combustion engine as recited in claim 18, wherein all cylinders are capable of being controlled in a skip fire manner.

21. An internal combustion engine as recited in claim 18, wherein the plurality of cylinders consists of 4 cylinders.

22. An internal combustion engine as recited in claim 18, wherein the internal combustion engine has two cylinder banks and all of the cylinders in a first one of the banks are capable of cylinder deactivation and all of the cylinders in a second one of the banks are capable of variable valve control but are not capable of cylinder deactivation.

23. An internal combustion engine as recited in claim 18, wherein the engine does not include a throttle.

* * * * *